US012784065B2

(12) United States Patent
Wellmann et al.

(10) Patent No.: US 12,784,065 B2
(45) Date of Patent: Nov. 3, 2026

(54) SYSTEMS AND METHODS FOR USING MACHINE LEARNING TECHNIQUES TO PREDICT ITEM GROUP COMPOSITION

(71) Applicant: Fidelity Information Services, LLC, Jacksonville, FL (US)

(72) Inventors: Benjamin Wellmann, Delray Beach, FL (US); Luke Jurat, Fairfax, VA (US); Edward S. Barker, Seattle, WA (US); Stephane Wyper, Calabasas, CA (US)

(73) Assignee: Fidelity Information Services, LLC

( * ) Notice: Subject to any disclaimer, the term of this patent is extended or adjusted under 35 U.S.C. 154(b) by 840 days.

(21) Appl. No.: 18/148,058

(22) Filed: Dec. 29, 2022

(65) Prior Publication Data

US 2024/0220822 A1 Jul. 4, 2024

(51) Int. Cl.

| | |
|---|---|
| ***G06Q 30/00*** | (2023.01) |
| ***G06N 5/022*** | (2023.01) |
| ***G06N 5/04*** | (2023.01) |
| ***G06Q 30/0202*** | (2023.01) |

(52) U.S. Cl.

CPC ......... *G06Q 30/0202* (2013.01); *G06N 5/022* (2013.01); *G06N 5/04* (2013.01)

(58) Field of Classification Search

None

See application file for complete search history.

(56) References Cited

U.S. PATENT DOCUMENTS

| | | | | |
|---|---|---|---|---|
| 10,949,825 | B1 * | 3/2021 | Brosamer | G06Q 20/202 |
| 12,045,851 | B2 * | 7/2024 | Padmanabhan | G06Q 30/0201 |
| 2010/0257092 | A1 | 10/2010 | Einhorn | |
| 2011/0093335 | A1 * | 4/2011 | Fordyce, III | G06Q 30/02 705/14.66 |
| 2015/0379430 | A1 * | 12/2015 | Dirac | G06N 20/00 706/12 |

(Continued)

OTHER PUBLICATIONS

International Search Report and Written Opinion for International Application No. PCT/US23/77375 dated Apr. 4, 2024 (13 pages).

*Primary Examiner* — Farhan M Syed

(74) *Attorney, Agent, or Firm* — FINNEGAN, HENDERSON, FARABOW, GARRETT & DUNNER, LLP

(57) ABSTRACT

Systems and methods for predicting item group composition are disclosed. A system for predicting item group composition may include a memory storing instructions and at least one processor configured to execute instructions to perform operations including: receiving entity identification information and a timestamp associated with a transaction without receiving information distinguishing items associated with the transaction; determining, based on the entity identification information, a localized machine learning model trained to predict categories of items based on transaction information applying to all of the items associated with the transaction; and applying the localized machine learning model to a model input to generate predicted categories of items associated with the transaction, the model input including the received entity identification information and a timestamp but not including information distinguishing items associated with the transaction.

14 Claims, 9 Drawing Sheets

(56) References Cited

U.S. PATENT DOCUMENTS

| | | | | |
|---|---|---|---|---|
| 2019/0213498 | A1* | 7/2019 | Adjaoute | G06N 3/126 |
| 2019/0333073 | A1* | 10/2019 | Harris | G06Q 30/02 |
| 2022/0058569 | A1* | 2/2022 | Cella | G06Q 10/10 |
| 2022/0092641 | A1* | 3/2022 | Tavassoli | G06N 20/00 |
| 2022/0309363 | A1* | 9/2022 | Rana | G06N 20/00 |
| 2022/0335447 | A1* | 10/2022 | Maiman | G06N 20/00 |
| 2023/0052423 | A1* | 2/2023 | Vijayan | G06N 20/00 |
| 2023/0079074 | A1* | 3/2023 | Cella | G06F 16/2455 707/769 |
| 2023/0110206 | A1* | 4/2023 | Karras | G06N 3/045 706/20 |
| 2023/0222388 | A1* | 7/2023 | Cella | G01R 21/133 706/12 |
| 2023/0222531 | A1* | 7/2023 | Cella | B25J 9/1682 705/7.31 |
| 2023/0334339 | A1* | 10/2023 | Lowe | G06N 5/022 |
| 2024/0013314 | A1* | 1/2024 | Briancon | G06F 16/254 |
| 2024/0220822 | A1* | 7/2024 | Wellmann | G06N 20/00 |

* cited by examiner

500

700

SYSTEMS AND METHODS FOR USING MACHINE LEARNING TECHNIQUES TO PREDICT ITEM GROUP COMPOSITION

TECHNICAL FIELD

The present disclosure generally relates to computerized methods and systems for predicting item group composition, which may be based on low-visibility data. This may involve using computerized modeling, which may be based on analyzing transactional data.

BACKGROUND

In current environments, entities such as sellers often seek to gain insight into detailed transactional data and consumer behavior patterns, such as categories of purchased items, when relevant details may be difficult or impossible to observe directly, such as due to lack of data, privacy barriers, or other technological impediments. In some situations, even if such insight is achieved, it occurs after data has become stale, making it irrelevant for making responsive decisions. Many conventional analytical techniques in these areas also rely on data from coarsely selected geographic areas, which often capture data from sellers in different sectors, or whose data would otherwise skew the predictive capabilities of modeling transactional data and consumer behavior patterns for a particular seller.

In some environments, sellers or other entities may also wish to understand and model transaction patterns of a particular individual, but often lack access to personally-identifying information that would directly enable this. Conventional techniques for analyzing consumer behavior data often are only capable of analyzing a single consumer trait, such as a time of a transaction or a purchase amount, and sometimes only using large amounts of anonymous and aggregated data, further disrupting responsive pinpointed decision-making. Moreover, traditional techniques are frequently aimed at examining large amounts of data to produce analysis, at which point the analysis is frequently obsolete or has required a large computational load. Many current analyses are also very crude and fail to fully capture detailed individual consumer behavior patterns across time, leading to poor predictions.

Considering this, a need exists in the seller data insight industry and other industries where predicting grouped item composition and consumer behavior patterns is useful, to provide highly localized, perceptive, rapid, and accurate computerized models of transaction detail and consumer behavior analysis information, without the need to access personally identifiable information. The present disclosure is directed to addressing these and other challenges.

SUMMARY

One aspect of the present disclosure is directed to a computer-implemented system for predicting item group composition. The system comprises a non-transitory computer-readable medium configured to store instructions and at least one processor configured to execute the instructions to perform operations. The operations include receiving entity identification information and a timestamp associated with a transaction without receiving information distinguishing items associated with the transaction; determining, based on the entity identification information, a localized machine learning model trained to predict categories of items based on transaction information applying to all of the items associated with the transaction; and applying the localized machine learning model to a model input to generate predicted categories of items associated with the transaction, the model input including the received entity identification information and a timestamp but not including information distinguishing items associated with the transaction.

Another aspect of the present disclosure is directed to a computer-implemented system for training an item group composition prediction model. The system comprises a non-transitory computer-readable medium configured to store instructions and at least one processor configured to execute the instructions to perform operations. The operations include initializing an untrained machine learning model; training the untrained machine learning model to predict item categories by: (i) inputting model training data to the untrained machine learning model, the model training data comprising first receipt-level transaction data and categories of items associated with the first receipt-level transaction data, the model training data being received from multiple distinct entities; and (ii) modifying at least one parameter of the untrained machine learning model to improve prediction of the categories of the items; and validating the trained machine learning model by inputting model validation data to the trained machine learning model, the model validation data comprising second receipt level transaction data not included in the first receipt level transaction data.

Another aspect of the present disclosure is directed to a computer-implemented system for developing a temporal behavioral profile. The system comprises a non-transitory computer-readable medium configured to store instructions and at least one processor configured to execute the instructions to perform operations. The operations include receiving first transaction information associated with a first transaction at a first time, the first transaction information not including a full transaction card number; determining that the first transaction information shares a threshold amount of attributes with second transaction information associated with at least one second transaction at one or more second times different from the first time; based on the determination that the first transaction information shares a threshold amount of attributes with the second transaction information, determining that the first transaction information and the second transaction information are associated with a single purchaser; constructing a temporal behavioral profile for the single purchaser based on the first transaction information and the second transaction information, the temporal behavioral profile being configured for predicting at least one future transaction associated with the single purchaser; and predicting the at least one future transaction associated with the single purchaser using the temporal behavioral profile.

Another aspect of the present disclosure is directed to a computer-implemented system for clustering behavior patterns. The system comprises a non-transitory computer-readable medium configured to store instructions and at least one processor configured to execute the instructions to perform operations. The operations include receiving receipt-level transaction data from multiple stores; determining a subset of the receipt-level transaction data satisfies a geographic parameter rule; altering the subset of the receipt-level transaction data by imputing categories or values to the receipt-level transaction data; extracting features from the subset of the altered receipt-level transaction data for model generation; applying a dimensionality reduction operation to the extracted features to generate reduced-dimension features; and generating clusters of behavior patterns based on the reduced-dimension features, the clusters being associated with different individuals.

Other aspects of the present disclosure are directed to methods for performing the functions of the computer-implemented systems discussed above, including non-transitory computer-readable media implementing instructions that, when executed by at least one computer processor, perform methods including those discussed above as well as throughout this disclosure.

Other systems, methods, and computer-readable media are also discussed herein.

DETAILED DESCRIPTION

Figure 1:
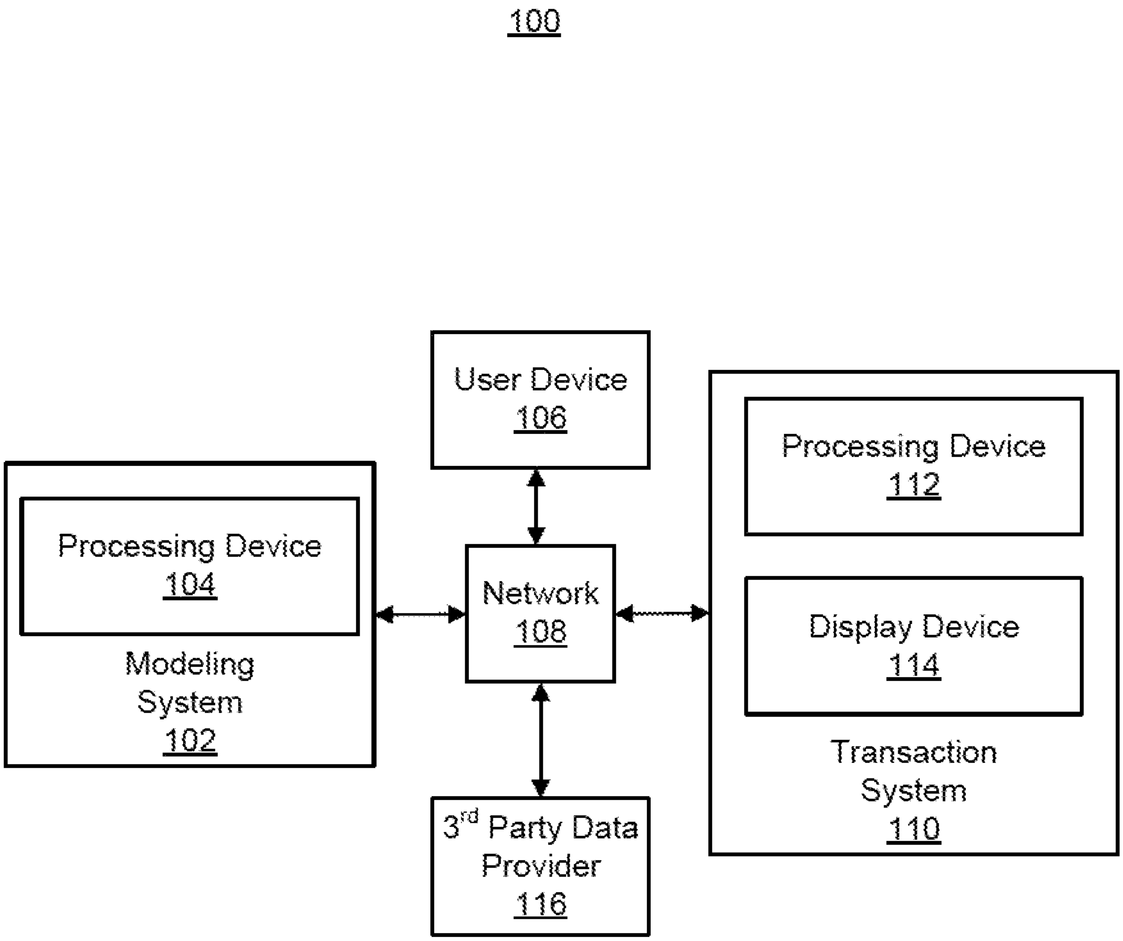
FIG. 1 is a schematic diagram of an example system architecture for machine learning predictions, consistent with the disclosed embodiments.

The disclosed embodiments include systems and methods for using machine learning to predict item categories and individual behavior patterns for future transaction analytics. Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the accompanying drawings, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure.

Reference will now be made in detail to the present example embodiments of the disclosure, examples of which are illustrated in the accompanying drawings. Wherever possible, the same reference numbers will be used throughout the drawings to refer to the same or like parts.

FIG. 1 is a schematic diagram illustrating an example system architecture 100 for generating and using machine learning predictions, consistent with the disclosed embodiments. In some embodiments, system architecture 100 may predict item composition, such as the items constituting all or a portion of a transaction, items intended for a transaction (e.g., items present in a physical or virtual shopping cart), and/or categories (or sub-categories) of items, as discussed further below. Additionally or alternatively, system architecture 100 may predict a temporal behavior pattern, which may be associated with a single individual, as is also discussed further below. Consistent with disclosed embodiments, system architecture 100 may analyze one or more data inputs to generate, train, re-train, and/or validate a machine learning model. System architecture 100 may also use a machine learning model to generate predictive outputs, detailed further below. Devices within system architecture 100 may include at least one module (examples of which are discussed below), which may include a program, code, model, workflow, process, thread, routine, coroutine, function, or other processing element for predicting item composition or a temporal behavior pattern.

In some embodiments, system architecture 100 may include a modeling system 102, which may be configured for creating and/or using machine learning models, such as those discussed herein. In some embodiments, modeling system 102 may associated with (e.g., be present within or connected within a local network of) a store, a seller, or other transacting entity. The term "store" as used herein is not limited to a physical building or any other physical space, but encompasses physical store spaces, as well as virtual store spaces, such as a website, a webpage, an application, or any other virtual interface between a user and a transacting entity (e.g., a seller). In some embodiments, a virtual store may be accessed using a particular Universal Resource Locator (URL) and/or a Universal Resource Identifier (URI). Alternatively, modeling system 102 may associated with (e.g., be present within or connected within a local network of) a service provider providing machine learning and other computational analytics capabilities. In some embodiments, modeling system 102 may include at least one processing device 104, which may be an instance of device 200. Processing device 104 may carry out all or any portion of the processes described herein. In some embodiments, modeling system 102 may include multiple processing devices 104, which may be communicably coupled through any kind of suitable wired and/or wireless local area network (LAN). In some embodiments, modeling system 102 may also utilize cloud computing technologies (e.g., for storage, caching, and/or processing).

In some embodiments, modeling system 102 may be communicably connected with user device 106, which may be associated with an individual, such as a shopper associated with a store, or a user of modeling system 102. For example, modeling system 102 may connect with user device 106, transaction system 110, and/or 3$^{rd}$ party data provider 116 through network 108. Network 108 may be a public or private network, and may include, without limitation, any combination of a Local Area Network (LAN), a Wide Area Network (WAN), a Metropolitan Area Network, an Institute of Electrical and Electronics Engineers (IEEE) 802.11 wireless network (e.g., "Wi-Fi"), wired network, a network of networks (e.g., the Internet), a land-line telephone network, a fiber optic network, and/or a cellular network. Network 108 may be connected to other networks (not depicted in FIG. 1) to connect the various system components to each other and/or to external systems or devices. In some embodiments, network 108 may be a secure network and require a password to access the network, or a portion of the network. In some embodiments, user device 106 may be an instance of device 200, discussed further below.

In some embodiments, system architecture 100 may include a transaction system 110, which may be associated with a store, a retailer, a financial service provider, a website, or any other entity associated with transactions of multiple items. In some embodiments, system architecture 100 may include multiple transaction systems 110, such as one transaction system associated with a retailer, and another transaction system associated with a financial service provider, which may have access to different datasets (e.g., datasets fully or partially access-restricted from the other respective system). In some embodiments, transaction system 110 may include at least one processing device 112, which may be a device 200. Processing device 112 may carry out all or any portion of the processes described herein. In some embodiments, transaction system 110 may include multiple processing devices 112, which may be communicably coupled through any kind of suitable wired and/or wireless local area network (LAN). In some embodiments, transaction system 110 may also utilize cloud computing technologies (e.g., for storage, caching, and/or processing). Transaction system 110 may include multiple processing devices 112, which may be located in different remote locations, such as within different stores. The term "location," as used herein, may refer to a physical location (e.g., geocoordinate location or street address location) or a virtual location (e.g., a website, an Internet Protocol address, known as an IP address, a URL, or a URI). In some embodiments, multiple locations (e.g., physical locations) may be associated with different location identifiers (e.g., geocoordinates, street addresses), but may be associated with a common entity identifier (e.g., identifying a business or company). In some embodiments, transaction system 110 may include at least one display device 114, which may include a display 214 (discussed further below). Display device 114 may be present in or near a store, and may display information associated with the store and/or an item, such as an item price, a sale price, promotion information, item information for an item of a particular category, item category information, or any other information that may be influenced or determined by machine learning output. In some embodiments, display device 114 may be affixed to an object, such as a shelf, an endcap, a wall, or any other stable structure that may hold up a display.

System architecture 100 may also include a 3$^{rd}$ party data provider 116, which may store data that can be used to enhance machine learning environments (e.g., operations carried out by modeling system 102), consistent with disclosed embodiments. In some embodiments, 3$^{rd}$ party data provider 116 may store data related to a particular field, such as demographics or economics. By way of example, 3$^{rd}$ party data provider 116 may store statistics from the United States Department of Labor, such as statistics relating to employment or income, or census data. As another example, 3$^{rd}$ party data provider 116, or another device, such as modeling system 102, may store payment processing information (e.g., data generated in response to attempted, pending, and/or completed transactions), local foot-traffic pattern information, in-stock information, demographic information, live or predicted weather information, live or predicted traffic information, or other additional context data (e.g., for using with transaction data). In some embodiments, a device within system architecture 100 may periodically extract up-to-date data from 3$^{rd}$ party data provider 116, such that a module may have more accurate datasets, which can be used as, for example, input data for training, re-training, and/or validating a machine learning model. In some embodiments, modeling system 102 may be configured to (e.g., have multiple data intake modules for) download data from multiple 3$^{rd}$ party data providers 116 and/or standardize the downloaded data into a format usable by a machine learning model (e.g., for use in process 300 or 600). A 3$^{rd}$ party data provider 116 may also connect to modeling system 102 through network 108.

Figure 2:
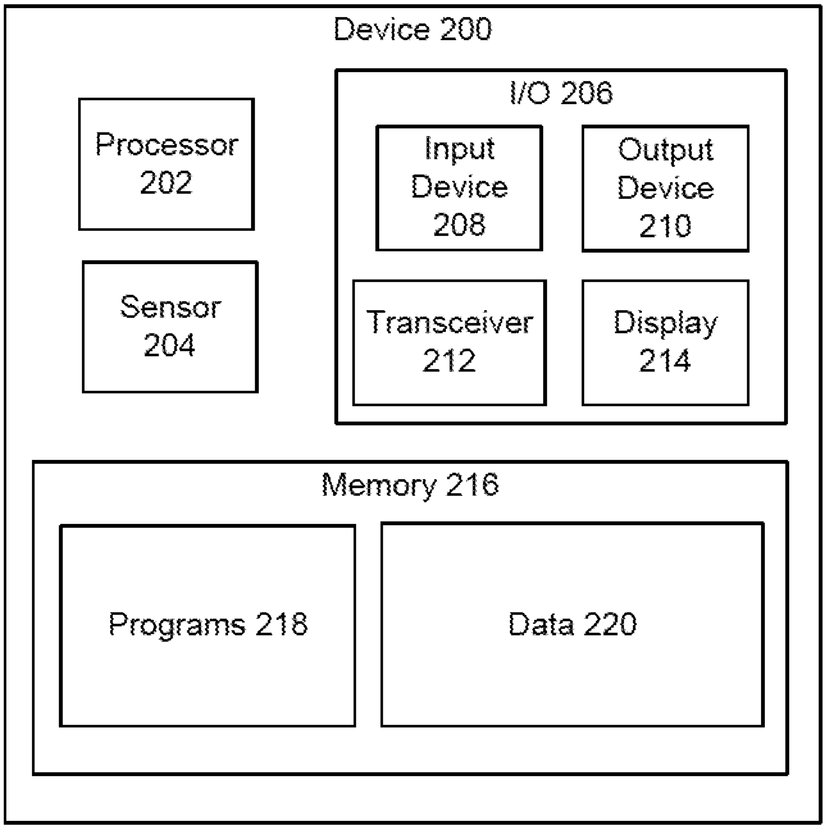
FIG. 2 is a block diagram of an example computing device for use in machine learning prediction environments, consistent with the disclosed embodiments.

FIG. 2 illustrates an exemplary pictographic representation of device 200, which may carry out processes discussed herein. For example, device 200 may constitute one or more of processing device 104, user device 106, processing device 112, display device 114 and/or 3$^{rd}$ party data provider 116. Device 200 may include a processor 202, which may include one or more dedicated processing units, application-specific integrated circuits (ASICs), field-programmable gate arrays (FPGAs), graphical processing units, or various other types of processors or processing units coupled with memory 216. Processor 202 may constitute a single-core or multiple-core processor that executes parallel processes simultaneously. For example, processor 202 may be a single-core processor configured with virtual processing technologies. In some embodiments, processor 202 may use logical processors to simultaneously execute and control multiple processes. Processor 202 may implement virtual machine technologies, or other known technologies to provide the ability to execute, control, run, manipulate, store, etc., multiple software processes, applications, programs, etc. For example, a virtual computing instance (e.g., virtual machine, container, etc.) may be spun up or spun down (e.g., at a processing device 104) in response to processing demands (e.g., additional resources needed for distance computation, model training, clustering, etc.). In another embodiment, processor 202 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 202 may execute various instructions stored in memory 216 to perform various functions of the disclosed embodiments described in greater detail below. Processor 202 may be configured to execute functions written in one or more known programming languages.

In some embodiments, device 200 may include a sensor 204, such as an accelerometer, a light sensor, an audio sensor, an infrared sensor, a motion sensor, a piezoelectric sensor, a laser sensor, a sonar sensor, a Global Positioning System (GPS) sensor, an electromagnetic sensor, and the like. Sensor 204 may detect and/or collect data, which device 200 may store (e.g., at memory 216) and/or transmit to another device. In some embodiments, a sensor 204 may be a sensor within a physical store, such as a weight sensor, a light sensor, a radio frequency identifier (RFID) sensor, an electromagnetic sensor, or any other sensor that may be used to monitor actions taken with respect to items (e.g., products) and/or individuals (e.g., shoppers), such as sensors associated with specific shelves, shelf units, aisles, or shopping carts.

Device 200 may also include input/output devices (I/O) 206, which may include an input device 208, which may include, for example, at least one of a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, or the like. As will be appreciated by one of skill in the art, input device 208 may be any device capable of receiving inputs, including user inputs (e.g., a key press, a mouse click, a mouse hover, a mouse click-and-drag, or a scrolling action), to perform or assist in performing methods consistent with disclosed embodiments.

I/O 206 may also include an output device 210, which may include any device configured to provide user feedback, such as a visual display, a light-emitting diode (LED), a speaker, a haptic feedback device, or the like.

I/O 206 may include a transceiver 212, which may be configured to connect with at least one of any type of data network. For example, transceiver 212 may be at least one of a mobile network transceiver, Wi-Fi transceiver, a LiFi transceiver, Near Field Communication (NFC) transceiver, a radio transceiver, an ultra-high frequency (UHF) transceiver, a Bluetooth transceiver, an infrared transceiver, or other wireless transceiver.

I/O 206 may include a display 214, which may display data or other information associated with the processes described herein. For example, display 214 may include a liquid crystal display (LCD), in-plane switching liquid crystal display (IPS-LCD), an LED display, organic light-emitting diode (OLED) display, active-matrix organic light-emitting diode (AMOLED) display, cathode ray tube (CRT) display, plasma display panel (PDP), digital light processing (DLP) display, or any other display capable of connecting to a user device and depicting information to a user. Display 214 may display graphical interfaces, interactable graphical elements, animations, dynamic graphical elements, and any other visual element.

Device 200 may also include memory 216, which may be a single memory component, or multiple memory components. Such memory components may include an electronic storage device, a magnetic storage device, an optical storage device, an electromagnetic storage device, a semiconductor storage device, or any suitable combination of the foregoing. For example, memory 216 may include any number of hard disks, random access memories (RAMs), read-only memories (ROMs), erasable programmable read-only memories (EPROMs or Flash memories), and the like. Memory 216 may include one or more storage devices configured to store instructions usable by processor 202 to perform functions related to the disclosed embodiments. Memory 216 may also include any number of programs, applications, application program interfaces (APIs), or any other data, consistent with the disclosed embodiments.

In some embodiments, memory 216 may store programs 218, which may include one or more programs (e.g., APIs, processes, modules, code, scripts, functions, pipeline elements, etc.) used to perform methods consistent with disclosed embodiments. For example, memory 216 may include operation code (e.g., operating system code, application operation code, etc.) according to which an application may run on device 200. Programs 218 may be written in one or more programming or scripting languages. Memory 216 may also maintain data 220, which may include data associated with a user account, an application, a particular device, a model, a communication, or any other data related to analyzing items, transactions, or individual behavior. Data may be exchanged with a device 200 or between devices (e.g., processing device 104 and processing device 112, processing device 104 and a database (not shown in FIG. 1), processing device 104 and 3rd party data provider 116, etc.) in accordance with any number of formats or protocols, including extensible markup language (XML), Representational State Transfer (REST), Simple Object Access Protocol (SOAP), JavaScript Object Notation (JSON), GraphQL, and the like.

Memory 216 may also include a model (not shown), which may be an artificial intelligence (AI) model for analyzing item data, transaction data, and/or individual behavior data, consistent with disclosed embodiments. A model may be, without limitation, any combination of a computer software module, an algorithm, a machine-learning model, a data model, a statistical model, a random forest model, an Extreme Gradient Boost (XG-Boost) model, a deep learning model, an Ordering Points to Identify the Clustering Structure (OPTICS) model, a Density-based Spatial Clustering of Applications with Noise (DBSCAN) model, a Hierarchical Density-based Spatial Clustering of Applications with Noise (HDBSCAN) model, or a k-means clustering algorithm, a recurrent neural network (RNN) model, a long-short term memory (LSTM) model, a convolutional neural network model, or another neural network model, consistent with disclosed embodiments. In some embodiments, a model may be a model in a learning stage or may have been trained and/or validated to a degree (e.g., by a developer, a machine, or a combination of both). In some embodiments, a developer may interact with a model to approve or disapprove of suggested changes to a model or parameters of a model (e.g., suggested by a machine). After such an interaction, the model may be updated to reflect the user interactions and/or machine inputs. In some embodiments, a model may be trained with training data from a single entity (e.g., a single store or a single seller) or with training data from multiple entities (e.g., multiple stores and/or multiple entities). The same may likewise be true for validation data.

Figure 3:
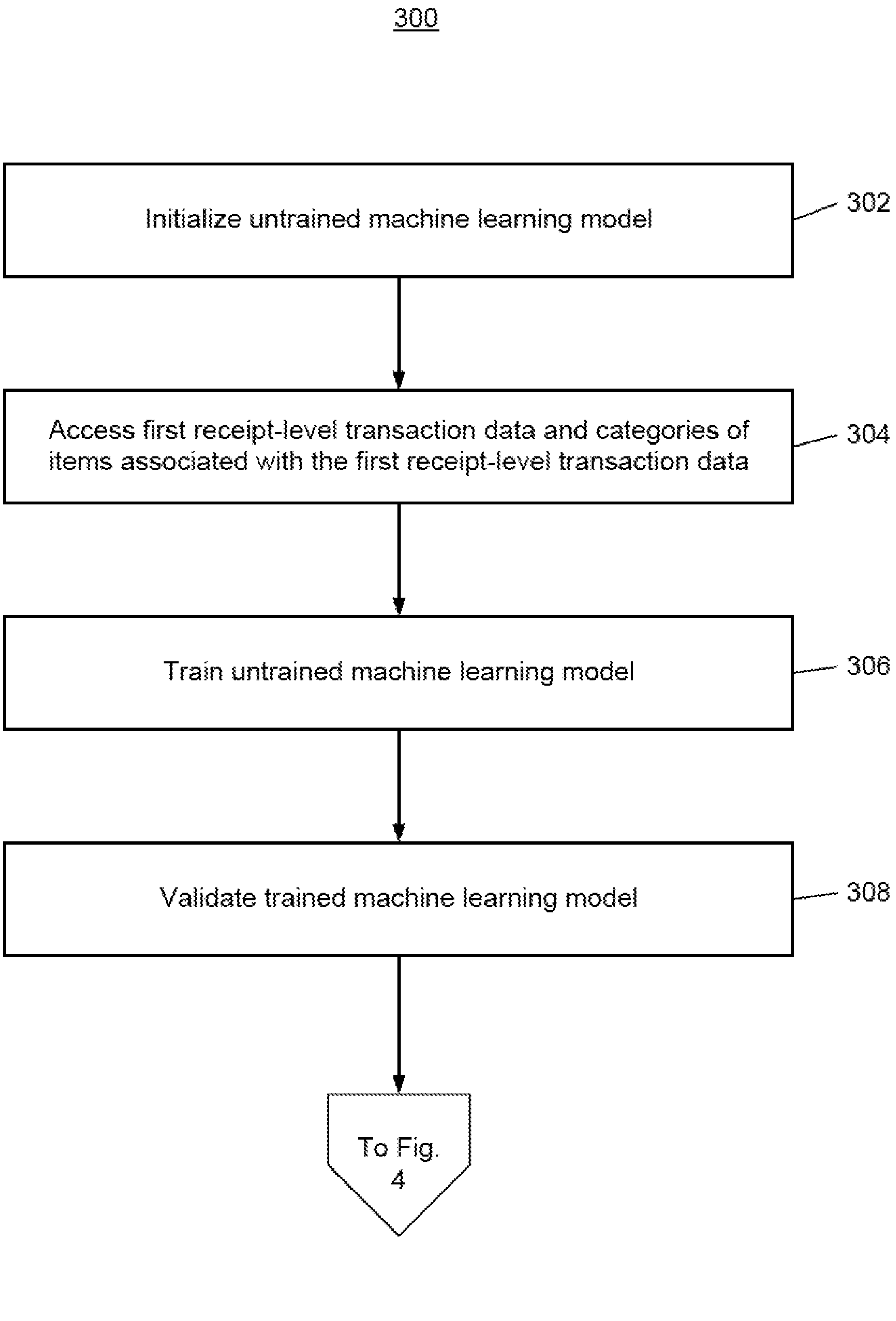
FIG. 3 is a flowchart of an example process for training a machine learning model to predict categories of items, consistent with the disclosed embodiments.

FIG. 3 is a flowchart of example process 300 for training an item group composition prediction model, consistent with the disclosed embodiments. Process 300 may be performed by a computer-implemented system (e.g., device 200) in modeling system 102 or transaction system 110, or by an apparatus (e.g., user device 106). The computer-implemented system may include a memory (e.g., memory 216) that stores instructions and a processor (e.g., processor 202) programmed to execute the instructions to implement process 300. Process 300 may be implemented as one or more software modules stored in memory 216 and executable by processor 202. For ease of description, some steps of process 300 are described as performed by a particular device, such as processing device 104. However, it should be noted that any step may be executed by any device within system architecture 100, such as processing device 112. Process 300 may incorporate aspects of steps from other processes discussed herein. For example, accessing first receipt-level transaction data at step 304 may include aspects of determining a subset of receipt-level transaction data as described with respect to step 604 of process 600. Any or all of these steps may be performed in multiple iterations, to provide robust training and/or validation for the model.

Referring to process 300 shown in FIG. 3, at exemplary step 302, processing device 104 may initialize an untrained machine learning model. Initializing an untrained machine learning model may include accessing the untrained machine learning model, retrieving the untrained machine learning model (e.g., from storage, whether local or remote), determining seed values, determining model training parameters (e.g., based on user input and/or an initialization algorithm), accessing model training data, requesting model training data (e.g., from a user and/or a remote source), or performing any operation to prepare a machine learning model for training.

In some embodiments, a partially trained or fully trained machine learning model may instead be initialized. For example, a fully trained machine learning model may be initialized so that it may be improved through additional training (e.g., according to process 300). In some embodiments, the machine learning model, whether trained, partially trained, or untrained, may include at least one of an XG-Boost model, a random forest model, a deep learning model, or any other type of model discussed herein.

At exemplary step 304, processing device 104 may access first receipt-level transaction data and categories of items associated with the first receipt-level transaction data. Receipt-level transaction data may include information (e.g., digital information or data) associated with one or more transactions, such as one or more of an item identification number, which may be associated with a particular item (e.g., a Stock Keeping Unit number, known as an SKU number, or a Universal Product Code number, known as a UPC number), an item name, an item purchase amount, a payment method identifier, a purchase time (e.g., indicated by a timestamp), a purchase date (e.g., indicated by a timestamp), a full transaction card number, a partial transaction card number, a discount identifier, a total transaction amount, a pre-discount transaction amount, a tax amount, a store identifier (e.g., a store name, a store address, a URL, a URI, and/or a store telephone number), a receipt identification number, a transaction identification number, a reference number, or a trace number, or any other information identifying a contextual attribute of a transaction. In some embodiments, receipt-level transaction data may be generated in response to one or more executed operations or communications between devices, such as scans of one or more items made by a barcode scanner and/or signals sent between a transaction card (e.g., a credit card or a debit card) and a point-of-sale (POS) device. Categories of items, including categories of items associated with the first receipt-level transaction data, may include words or phrases identifying a product area associated with an item. By way of example and without limitation, these may include "Groceries," "Alcohol," "Home Goods," "Pharmacy," "Personal Care," "Clothing," "Electronics," or any other identifier that may apply to multiple items. In some embodiments, categories of items may be associated with particular respective identifiers (e.g., an item category identifier), which may be standardized, and may include an alphanumeric character combination or any other unique machine-readable identifier. Accessing the first receipt-level transaction data and categories of items associated with the first receipt-level transaction data may include requesting access to or receipt of the first receipt-level transaction data and/or the categories of items, accessing the first receipt-level transaction data and/or the categories of items from local storage, and/or receiving the first receipt-level transaction data and/or the categories of items from remote storage (e.g., a memory 216 of a transaction system 110). In some embodiments, processing device 104 may use the accessed first receipt-level transaction data and/or categories of items associated with the first receipt-level transaction data to generate attribute data (e.g., associated with an entity from which the first receipt-level transaction data and/or categories of items were received), which may be used to update a cluster, consistent with embodiments discussed below. In some embodiments, processing device 104 may alter accessed data, such as by determining a subset of data or performing a dimensionality operation (or any other operation discussed with respect to process 600), which may be performed prior to training and/or generating a model.

At exemplary step 306, processing device 104 may train the untrained machine learning model to predict item categories, which may be associated with items of one or more transactions. Training the untrained machine learning model may include one or more of inputting model training data to the untrained machine learning model (which may include receipt-level transaction data as well as non-receipt-level transaction data), executing the untrained machine learning model with the model training data, modifying at least one parameter of the untrained machine learning model to improve prediction of the categories of the items, or establishing a relationship (e.g., a correlation) between pieces of model input data and/or output data. In some embodiments, a trained machine learning model may be monitored to determine performance metrics (e.g., accuracy of predictions) and may be re-trained periodically (e.g., according to process 300). Re-training may be based on actual data collected (e.g., data the model attempted to predict) and predictions made by the model, to reduce error rates of the model over time. In some embodiments, the model training data may comprise the first receipt-level transaction data and categories of items associated with the first receipt-level transaction data, discussed above. Additionally or alternatively, the model training data may comprise model input data based on the first receipt-level transaction data and categories of items associated with the first receipt-level transaction data, discussed above. "Based on," as used herein to say that one aspect is "based on" a second aspect, refers to one aspect being established or founded upon, dependent upon, interdependent with, influenced by, caused by, or otherwise derived from a second aspect. In some embodiments, model input data may also include one or more of demographic information, economic information, payment processing information (e.g., data generated in response to attempted, pending, and/or completed transactions), local foot-traffic pattern information, in-stock information, demographic information, live or predicted weather information, live or predicted traffic information, or other additional context data.

In the current example, raw first receipt-level transaction data and/or raw category data may not be suitable as model training data, and may be modified through one or more operations into a model training data configuration. For example, processing device 104 may impute null values to the raw data, may aggregate different portions of raw data (e.g., from multiple transactions and/or transaction entities), may delete outliers from raw data, may structure unstructured portions of the raw data (e.g., parse the raw data into fields), may derive data from the raw data, may perform an optical character recognition (OCR) operation to the raw data, or may format the raw data as formatted model input data. Modifying at least one parameter of the untrained machine learning model may include one or more of adding a parameter to the machine learning model, removing a parameter from the machine learning model, changing an existing parameter of the machine learning model, or altering a structure of the machine learning model (e.g., rearranging, adding, and/or deleting a node, a layer, or a connection between model elements).

In some embodiments, the model training data may be received from multiple distinct entities, such as different stores or financial service providers. For example, the model training data may include model training data from distinct stores that share a common attribute (e.g., stores within a geographical boundary, stores in a similar retail category, or stores in or near a same cluster). In some embodiments, the model may be trained to be a global model (e.g., location-based). Alternatively, the model may be trained to be specialized based on a particular region and/or type of data.

In some embodiments, training the untrained machine learning model may include determining, from model training dataset, a subset of model training data to use to train the untrained machine learning model. Determining the subset of model training data may include determining model training data from at least two entities (e.g., stores) that are in a same cluster, which may have been generated according to a clustering model. In some embodiments, a clustering model may be configured to cluster data (e.g., receipt-level transaction data) received from multiple entities into different clusters, where each cluster may be associated with a different set of entities. For example, a clustering model may include a k-means clustering model, a mean shift clustering model, a divisive hierarchical clustering model, a Gaussian mixture clustering model, a DBSCAN clustering model, an OPTICS clustering model, or a Balanced Iterative Reducing and Clustering using Hierarchies (BIRCH) clustering model. A machine learning model may be trained on a data associated with a specific cluster, and may thus be considered "localized" to that cluster, consistent with disclosed embodiments.

In some embodiments, the clustering model may generated be generated through one or more operations, including by performing at least one of: aggregating receipt-level transaction data from multiple entities, imputing values to a portion of the receipt-level transaction data, removing outlier values from the receipt-level transaction data, or applying price constraints or basket constraints to receipt-level transaction data. Receipt-level transaction data may include transactional information associated with one or more receipts and/or transactions, such as one or more of an SKU number, a UPC number, an item name, an item purchase amount, a payment method identifier, a purchase time (e.g., indicated by a timestamp), a purchase date (e.g., indicated by a timestamp), a full transaction card number, a partial transaction card number, a total transaction amount, a store identifier, or any other information identifying a contextual attribute of a transaction, such as is discussed above with respect to step 304. A price constraint or basket constraint may include a static or dynamic numerical boundary on a value that may be kept within the receipt-level transaction data for purposes of generating the clustering model. In some embodiments, raw or refined receipt-level transaction data (e.g., receipt-level transaction data with one or more of the above operations applied) may be included within attribute data, which may be associated with one or more entities. In some embodiments, processing device 104 (or other device) may generate the clustering model.

In some embodiments, the clustering model may be configured to determine numeric-space representations (e.g., Euclidean space coordinate values or Cartesian space coordinate values) for attribute data associated with one or more entities, such as sellers or stores. In some embodiments, the numeric-space representations may be formed into clusters output from the clustering model, and one or more of the clusters may be associated with a particular combination of attribute data (discussed further below), attribute data from entities with a geographic profile falling within geographic constraints, and/or entities with a product selling profile with a particular set of parameters (e.g., threshold amount of overlapping product SKU numbers or UPC numbers, threshold amount of overlapping purchase patterns). Additionally or alternatively, the numeric-space representations may be formed into clusters based on a similarity metric reaching a threshold, where the similarity metric is associated with a similarity of SKUs (or other product identification numbers), products (e.g., product names), and/or brands. For example, the numeric-space representations may be formed into clusters based on correlations (e.g., similarities) identified between products and substitute products.

In some embodiments, the clustering model may access or receive first attribute data associated with a first store (or other entity) and may access or receive second attribute data associated with one or more second stores (or other entity or entities). In some embodiments, the clustering model may determine a first numeric-space representation for the first store based on the first attribute data, and may also determine a second numeric-space representation for at least one second store based on the second attribute data. In some embodiments, a dimensionality reduction operation may be applied to the attribute data (which may include receipt-level transaction data) prior to determining numeric-space representations representing the attribute data.

The clustering model may compute at least one first distance between the first numeric-space representation and at least one of a plurality of third numeric-space representations. Then, the clustering model may associate the first numeric-space representation with a cluster based on the computed at least one first distance. For example, if the at least one first distance is less than a particular threshold value, the clustering model may associate the first numeric-space representation with the cluster. Additionally or alternatively, if the at least one first distance is the shortest distance between first numeric-space representation and any cluster being examined by the clustering model, the clustering model may associate the first numeric-space representation with the cluster.

In some embodiments, the clustering model may also compute at least one second distance between the second numeric-space representation and at least one of a plurality of third numeric-space representations, which may include using a threshold or shortest distance, as discussed above with respect to the first numeric-space representation. The clustering model may also associate the second numeric-space representation with a cluster, such as the same cluster with which the first numeric-space representation is associated, based on the computed at least one second distance.

In some embodiments, attribute data may include at least one of a location, population metrics, a sector category, or transaction trend information. For example, the first attribute data may include at least one of a location of the first store (or other entity), population metrics associated with the first store, a sector category associated with the first store, or transaction trend information associated with the first store. Also, the second attribute data includes at least one of a location of the at least one second store, population metrics associated with the at least one second store, a sector category associated with the at least one second store, or transaction trend information associated with the at least one second store. A location of an entity may include one or more of geographical coordinate information (latitude and longitude coordinates), a street address, a zip code, a locality identifier (e.g., county name, state name, region name), or a country identifier (e.g., a county name or country code). Different location identifiers may be associated with a common entity identifier, as discussed above. Population metrics associated with an entity may include demographic information associated with the entity (e.g., based on a location of the entity, such as by using census data). A sector category may include any indication of one or more item types sold by an entity (e.g., groceries, home improvement goods, clothing), such as an item category identifier or Merchant Category Code (MCC). Transaction trend information may include times of purchases (e.g., indicated by timestamps generated in response to an attempted transaction, a completed transaction, and/or a communication between devices), items purchased, a total purchase amount, an SKU number, a UPC number, an item purchase amount, a payment method identifier, a purchase time, or a discount identifier. Transaction trend information may also include statistical information of transactions for the entity over time (e.g., a statistical model), which may be based on these elements. In some embodiments, the first attribute data may include first transaction trend information associated with the first store, the second attribute data may include second transaction trend information associated with the at least one second store, and the first transaction trend information and the second transaction trend information both include at least one of a Stock Keeping Unit (SKU) number, an item purchase amount, a payment method identifier, a purchase time, or a discount identifier, consistent with disclosed embodiments.

In some embodiments, processing device 104 may extrapolate, for example by the localized machine learning model (discussed below) or another machine learning model, a sector category associated with the first store or a sector category associated with the at least one second store, based on a correlation learned from receipt-level transaction data. For example, processing device 104 may learn patterns associated with aggregated store-level transactions, and associated similar patterns with similar types of stores (e.g., competing stores).

At exemplary step 308, processing device 104 may validate the trained machine learning model (e.g., a model trained at step 306). Validating the trained machine learning model may include inputting model validation data to the trained machine learning model. Model validation data may include model input data extracted from raw data, as discussed above. In some embodiments, the model validation data may comprise second receipt-level transaction data not included in the first receipt-level transaction data. In some embodiments, the second receipt-level transaction data may be sourced from a same store and/or a same cluster of stores as the first receipt-level transaction data. Alternatively, the model validation data may not include receipt-level transaction data, and may instead include reduced visibility data, such as data that does not include a fully transaction card number and/or does not include information distinguishing items associated with the transaction (e.g., individual item identification numbers and/or individual item purchase amounts). In some embodiments, validating the trained machine learning model may include establishing a relationship (e.g., a correlation) between pieces of model input data and/or output data. In some embodiments, validating the trained machine learning model may include scoring the machine learning model according to how accurately the trained machine learning model analyzed the model validation data (e.g., how accurately the model identified a correlation and/or how accurately the model determined a relationship between receipt-level transaction data and category information). Following training and/or validation, the machine learning model may be configured to predict (e.g., determine a probability or probability distribution of) item group composition (e.g., categories of items associated with a transaction) using input including transaction information applying to all of the items associated with the transaction, but without using input that identifies items that are part of the transaction (e.g., an individual item payment amount, an item name, or an item identification number). In this manner, the machine learning model may be configured to generate detailed predictions of future actions with only generalized input data, providing a technical solution (discussed further herein), which also cannot be practically accomplished by the human mind because of information missing from the input. In some embodiments, after validating the model, process 300 (which may be operated repeatedly) may proceed to one or more steps of process 400, discussed below.

Figure 4:
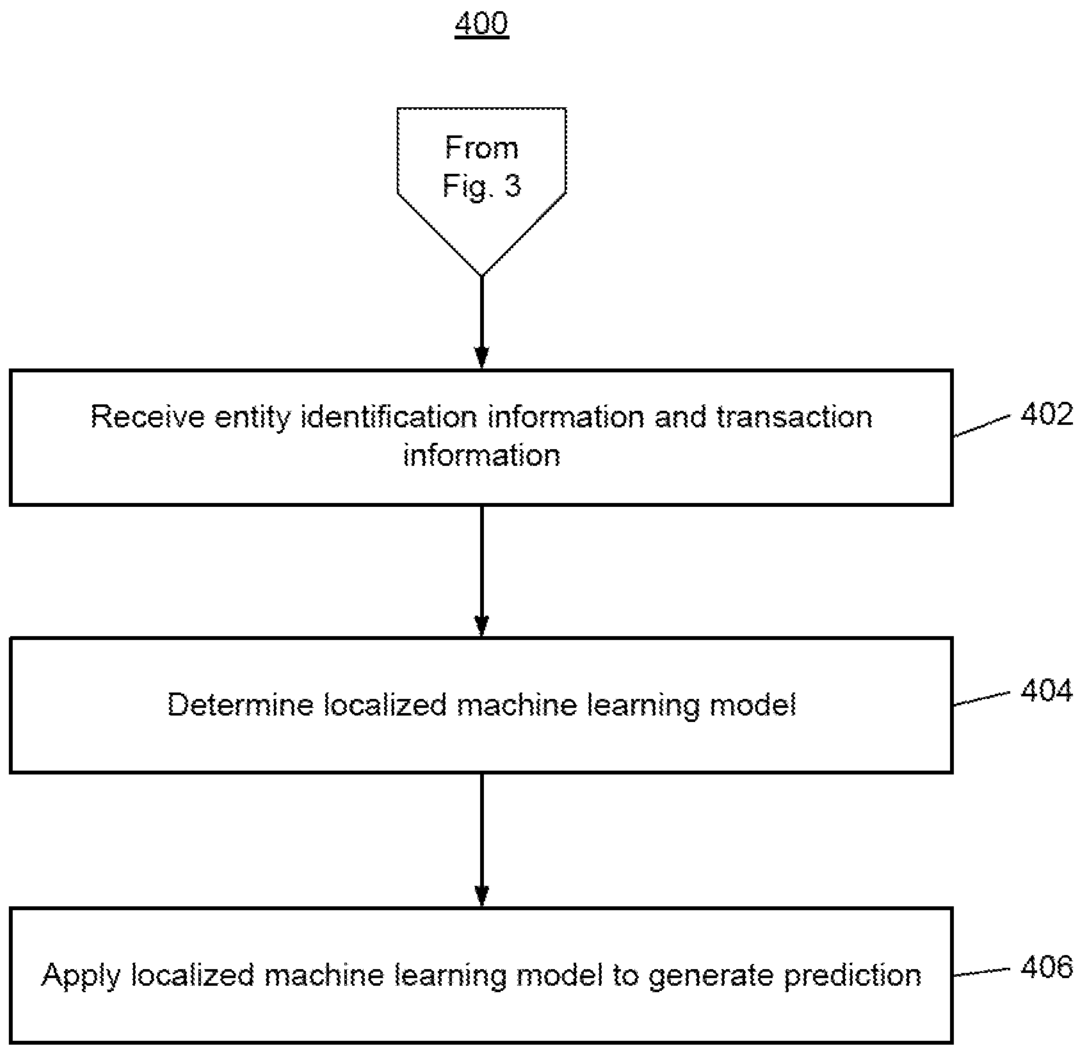
FIG. 4 is a flowchart of an example process for predicting categories of items, consistent with the disclosed embodiments.

FIG. 4 is a flowchart of an example process 400 for predicting item group composition, consistent with the disclosed embodiments. Process 400 may be performed by a computer-implemented system (e.g., device 200) in modeling system 102 or transaction system 110, or by an apparatus (e.g., user device 106). The computer-implemented system may include a memory (e.g., memory 216) that stores instructions and a processor (e.g., processor 202) programmed to execute the instructions to implement process 400. Process 400 may be implemented as one or more software modules stored in memory 216 and executable by processor 202. For ease of description, some steps of process 400 are described as performed by a particular device, such as processing device 104. However, it should be noted that any step may be executed by any device within system architecture 100, such as processing device 112. Process 400 may incorporate aspects of steps from other processes discussed herein. For example, determining a localized machine learning model at step 404 may include determining a model trained according to process 300. Process 400 may be implemented (e.g., executed) periodically (e.g., every day, every hour, or every predetermined time period), on demand (e.g., in response to a request received from a device such as processing device 112), and/or in response to a triggering action, such as a processing device detecting receipt of new transaction information.

Referring to process 400 shown in FIG. 4, at exemplary step 402, processing device 104 may receive entity identification information and transaction information (e.g., digital information). Receiving the entity identification information and/or transaction information may include requesting access to or receipt of the entity identification information and/or transaction information, accessing the entity identification information and/or transaction information from local storage, and/or receiving the entity identification information and/or transaction information from remote storage (e.g., a memory 216 of a transaction system 110). Entity identification information may include a name of an entity (e.g., organization, company, retailer), a location of an organization (e.g., a location of a physical store such as an address or geographical coordinate information), a retail category of an entity (e.g., indicating that the entity is a grocery store, home improvement store, an electronics store, or any other specialized store), or any other information distinguishing an entity from other entities. In some embodiments, a retail category of an entity may be associated with a particular (e.g., standardized identifier), such as an MCC. In some embodiments, the entity identification information may identify a first store. Additionally, the entity identification information may identify multiple stores, which may or may not be associated with a same entity (e.g., a single organization or business), which may also be identified by the entity identification information. Transaction information may include general transaction data (e.g., aggregated or statistical representations of receipt-level transaction data) and/or receipt-level transaction data (discussed above with respect to step 304), such as a payment method identifier, a purchase time (e.g., indicated by a timestamp), a purchase date (e.g., indicated by a timestamp), a full transaction card number, a partial transaction card number, a total transaction amount, or a store identifier.

In some embodiments, processing device 104 may receive transaction information that does not identify specific items associated with the transaction (e.g., transaction information applying to all items associated with the transaction). In some embodiments, processing device 104 may receive only transaction information (e.g., without entity identification information, which may be inferred). In some embodiments, processing device 104 may receive a total transaction amount associated with the transaction (e.g., transaction information applying to all items associated with the transaction), without receiving information distinguishing items associated with the transaction.

At exemplary step 404, processing device 104 may determine a localized machine learning model. A localized machine learning model may have been trained using model input from a particular cluster, as discussed above. In some embodiments, the determination of (e.g., selection of) the localized machine learning model may be based on the entity identification information. For example, processing device 104 may identify an association between the entity identification information and a cluster with which the localized machine learning model is associated (e.g., a cluster associated with input used to train the localized machine learning model), and may determine (e.g., select) the localized machine learning model based on the association (e.g., in response to identifying the association). By way of further example, processing device 104 may determine that the entity identification information identifies a particular retail category, and may identify a cluster associated with the particular retail category (e.g., trained using input associated with the particular retail category).

In some embodiments, the localized machine learning model may be trained to predict (e.g., determine, for a point in time or a span of time, at least one probability or probability distribution of) categories of items based on transaction information applying to all of the items associated with the transaction. Transaction information applying to all of the items associated with the transaction may include, for example, a total transaction amount, a payment method identifier, a purchase time, a purchase date, a full transaction card number, a partial transaction card number, a pre-discount transaction amount, a tax amount, or a store identifier. In some embodiments, the determined localized machine learning model may include at least one of an Extreme Gradient Boosting (XG-Boost) model, a random forest model, a deep learning model, or any other machine learning model discussed herein (e.g., regarding memory 216). In some embodiments, the determined localized machine learning model may be a metamodel (e.g., a model of models).

In some embodiments, the localized machine learning model may be trained to predict categories of items based on data received from at least one second store (e.g., where entity identification information received at step 402 identifies a first store). For example, the localized machine learning model may have been trained using receipt-level transaction data and categories of items associated with receipt-level transaction data, either or both of which may be associated with one or more second stores. In some embodiments, the at least one second store may be in a same cluster as the first store. For example, the first store and the at least one second store may be clustered in a same cluster based on application of a clustering model, such as application of a clustering model to first attribute data received from the first store and second attribute data received from the at least one second store, as discussed above with respect to process 300.

At exemplary step 406, processing device 104 may apply the localized machine learning model to a model input to generate a prediction. Generating a prediction may include one or more of initializing the localized machine learning model (e.g., with seed values and/or model input values), accessing transaction information (e.g., associated with past transactions), updating the localized machine learning model, inputting query parameters to the localized machine learning model, determining a probability of a particular output (e.g., associated with a future action), determining a probability distribution of particular outputs over time, or otherwise prompting the localized machine learning model to generate a predictive output. For example, processing device 104 may apply the localized machine learning model to a model input to generate one or more predicted categories of items associated with the transaction. In some embodiments, the model input may include the received entity identification information and a timestamp but may not include information distinguishing items associated with the transaction, such as an item identification number (e.g., an SKU number), an item transaction amount, or an item name. In some embodiments, the model input may include a total transaction amount but may not include information distinguishing items associated with the transaction (e.g., transaction information that does not identify specific items associated with the transaction).

In some embodiments, applying the localized machine learning model to the model input may also generate predicted sub-categories of items associated with the transaction. For example, processing device 104 may apply the localized machine learning model to a model input to generate a predicted sub-category of "produce," instead of, or in addition to, generating a prediction of a category of "groceries." In some embodiments, applying the localized machine learning model to the model input may generate (e.g., cause the model to generate) at least one predicted brand associated with the transaction. For example, the localized machine learning model may have been trained to identify correlations between particular combinations of input data (e.g., transaction information and/or entity identification information) and one or more brands (e.g., brands predicted to be associated with a transaction). In some embodiments, the localized machine learning model may be trained to predict categories of items, and may be configured (e.g., trained) to predict one or more brands based on one or more predicted categories of items (e.g., using the one or more predicted categories of items). In some embodiments, one machine learning model may be trained to predict categories of items, and another machine learning model may be trained to predict one or more brands.

In some embodiments, processing device 104 may generate a recommendation based on the generated predicted categories of items associated with the transaction. A recommendation may include text, a graphic (e.g., a dynamic graphic that changes displayed information in response to user input), digital audio information (e.g., usable to output sound at an output device), an animation, or any other visual or auditory output conveying information related to the generated predicted categories of items (e.g., which may be output at output device 210). For example, a recommendation may indicate to increase stock of a particular item or category of items, to change a placement (e.g., within a physical store) of a particular item or category of items, to change visual information associated with a particular item or category of items (e.g., structural or content information displayed in a physical store and/or present on a webpage), to begin or end a discount associated with a particular item or category of items, or to change a price associated with a particular item or category of items. In some embodiments, the recommendation may be transmitted to another device, such as a remote device (e.g., user device 106 or processing device 112). In some embodiments, the recommendation may be transmitted in real time relative to the generated predicted categories of items associated with the transaction.

In some embodiments, processing device 104 may prompt another device (e.g., processing device 112 or 3rd party data provider 116) for additional information (e.g., in-stock information, demographic information, live or predicted weather information, live or predicted traffic information), and may generate the recommendation based on the additional information. In some embodiments, processing device 104 may crawl or scrape (e.g., periodically) digital information from one or more webpages, and may generate the recommendation based on the crawled or scraped digital information. In some embodiments, a recommendation may be based on, or include, model input (e.g., an item price, an item discount, an item in-stock amount) predicted by a machine learning model to cause, or have a threshold probability of causing, a particular outcome (e.g., a change in or amount of sales, a change in or amount of profit, a change in or amount of revenue, a change in or amount of overstock), which may be based on one or more machine-learned relationships (e.g., according one or more operations associated with process 300). A recommendation may also share any characteristic of a recommended action, discussed further below.

In some embodiments, processing device 104 may cause alteration of, based on the generated predicted categories of items associated with the transaction, a graphic presented at a display (e.g., display device 114). A graphic may include information associated with one or more items (e.g., price information, discount information, an item depiction, an item name). Causing alteration of a graphic presented at a display may include transmitting instructions to the display (or an associated device or network) to change displayed information (e.g., contemporaneously when the instructions are received or at a future time) or transmitting updated information to be displayed to the display (or an associated device or network). In some embodiments, the display may be a display of a user device 106 and/or may be associated within a store (e.g., a display device 114 within a physical store). In some embodiments, the display may be associated with a particular location within a store (e.g., a store wall, an aisle endcap, an aisle, a shelf).

In some embodiments, processing device 104 may generate, based on the generated predicted categories of items associated with the transaction, an offer notification. An offer notification may include a discount, a reward, or any promotion, which may be associated with one or more predicted categories of items associated with the transaction. In some embodiments, the offer notification may be associated with a category of items that is not associated with the transaction (e.g., no items that are part of the transaction are associated with the category associated with the offer notification). In some embodiments, processing device 104 may transmit the offer notification to a user device (e.g., user device 106). In some embodiments, processing device 104 may transmit the offer notification to a user device while the user device is within a proximity threshold of a store (e.g., inside a store or within a threshold distance outside of a store). In some embodiments, an offer notification may be transmitted in real time relative to the generated predicted categories of items associated with the transaction.

Figure 5:
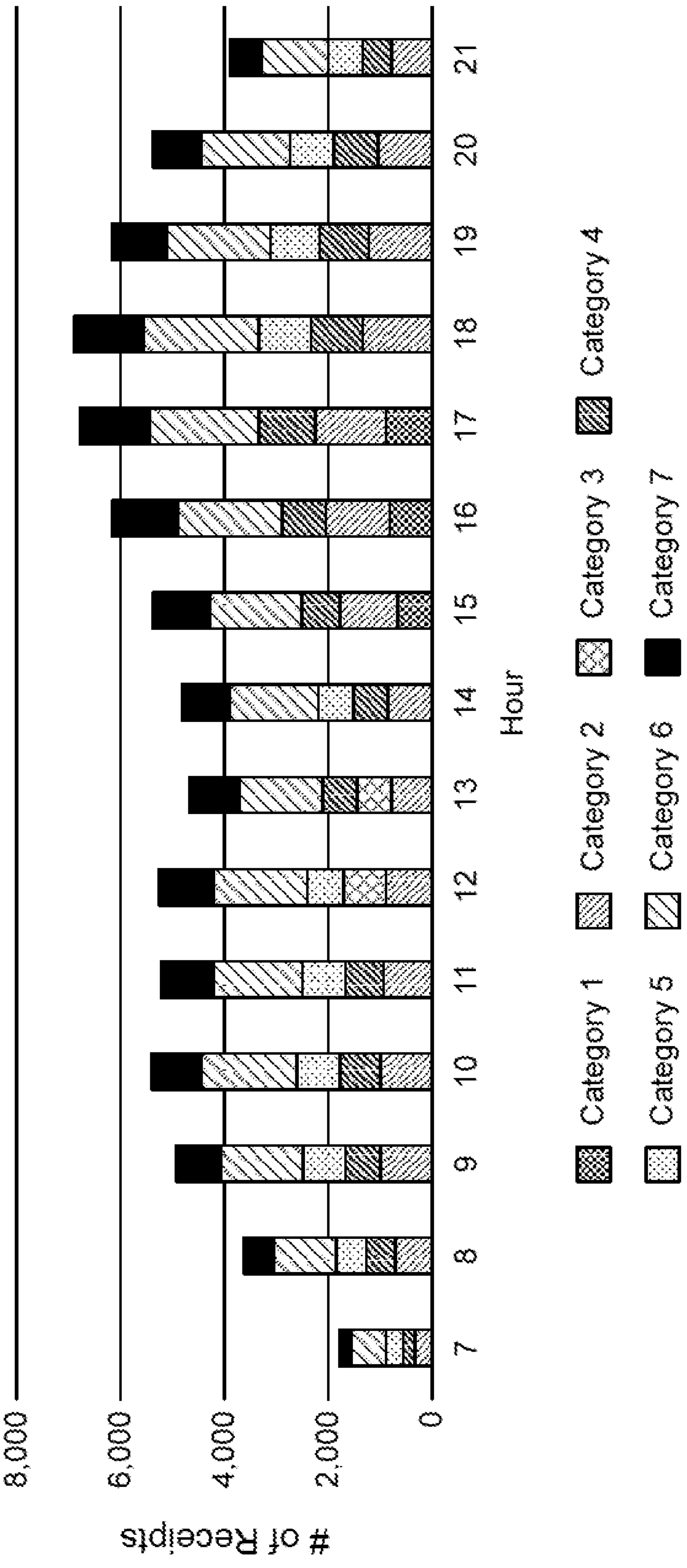
FIG. 5 is an example diagram of a bar graph of aggregated receipt-level transaction data, consistent with the disclosed embodiments.

FIG. 5 is an example diagram of bar graph 500 of aggregated receipt-level transaction data, consistent with disclosed embodiments. Bar graph 500 may be generated based on data from one or more stories and/or entities, such as receipt-level transaction data. For example, bar graph 500 may include one or more categories (for instance, as shown) associated with one or more past transactions at different times (e.g., hours, as indicated). The one or more categories may be extracted from receipt-level transaction data or may be generated based on machine-learned and/or user-configured data associations. Additionally or alternatively, bar graph 500 may include one or more categories predicted for future transactions at different times (e.g., output by a machine learning model, as discussed herein). In some embodiments, bar graph 500 may constitute, or be associated with, an output of a machine learning model (e.g., a trend prediction representation), which models and/or indicates categories predicted for future transactions. In some embodiments, bar graph 500 may include predictions associated with one or more stores and/or entities.

Figure 6:
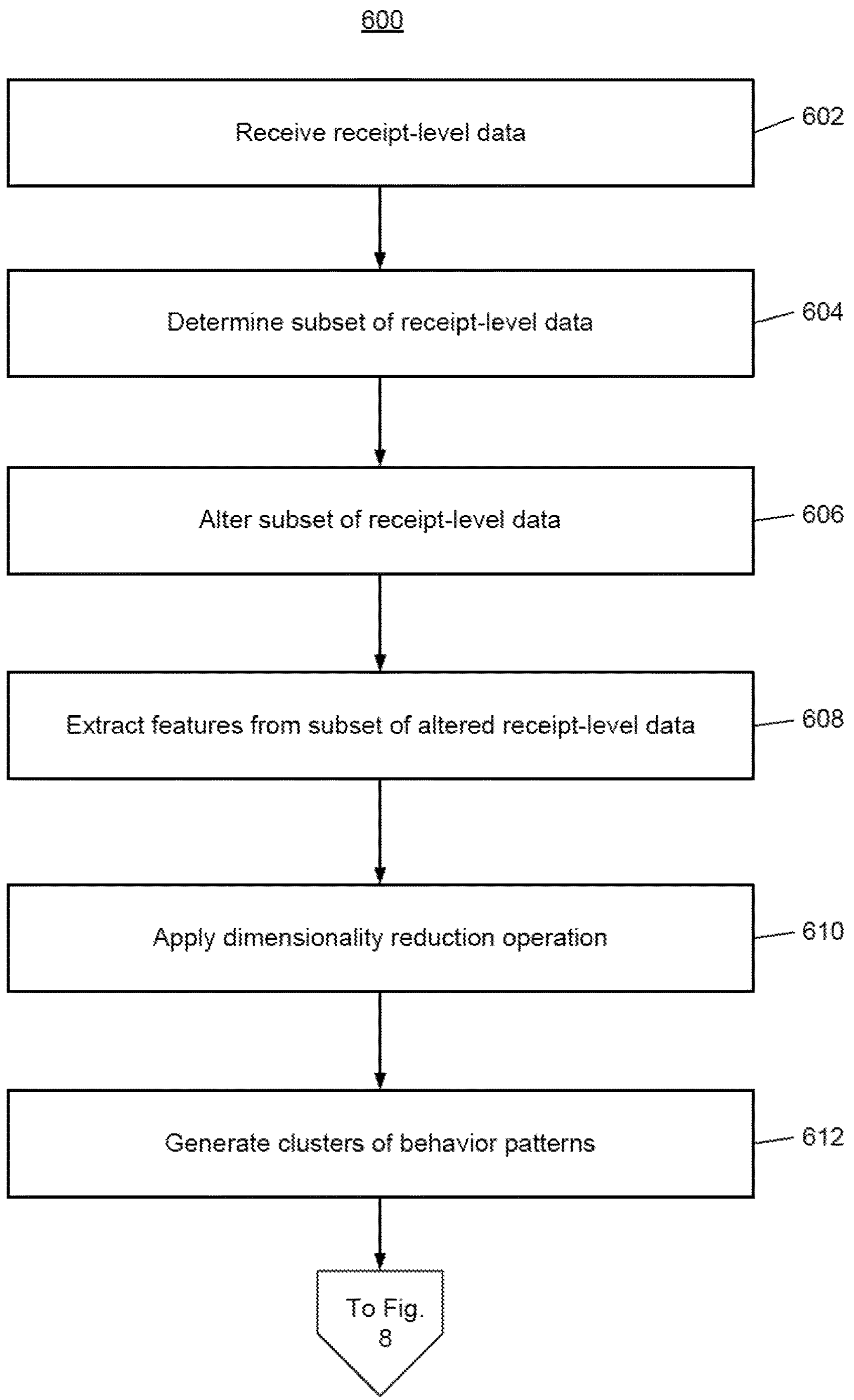
FIG. 6 is a flowchart of an example process for clustering behavior patterns, consistent with the disclosed embodiments.

FIG. 6 is a flowchart of example process 600 for clustering behavior patterns, consistent with the disclosed embodiments. Process 600 may be performed by a computer-implemented system (e.g., device 200) in modeling system 102 or transaction system 110, or by an apparatus (e.g., user device 106). The computer-implemented system may include a memory (e.g., memory 216) that stores instructions and a processor (e.g., processor 202) programmed to execute the instructions to implement process 600. Process 600 may be implemented as one or more software modules stored in memory 216 and executable by processor 202. For ease of description, some steps of process 400 are described as performed by a particular device, such as processing device 104. However, it should be noted that any step may be executed by any device within system architecture 100, such as processing device 112. Process 600 may incorporate aspects of steps from other processes discussed herein. For example, process 600 may generate one or more clusters associated with transaction information (e.g., transaction information associated with one or more individuals), according to aspects discussed with respect to process 300.

Referring to process 600 shown in FIG. 6, at exemplary step 602, processing device 104 may receive receipt-level transaction data, which may be received from multiple stores (e.g., stores associated with a common entity or stores associated with different entities). Receipt-level transaction data may include transactional information associated with one or more receipts and/or transactions, such as one or more of a Stock Keeping Unit (SKU) number (e.g., associated with a particular item), an item name, an item category identifier, an item purchase amount, a payment method identifier, a purchase time (e.g., indicated by a timestamp), a purchase date (e.g., indicated by a timestamp), a full transaction card number, a partial transaction card number, a total transaction amount, a store identifier, an entity identifier (e.g., an MCC), or any other information identifying a contextual attribute of a transaction, such as is discussed above with respect to step 304. In some embodiments, processing device 104 may receive receipt-level transaction data from one or more systems or devices (e.g., transaction systems 110 or processing devices 112). In some embodiments, receipt-level transaction data may include digital information generated at different remote locations at different times (e.g., in response to communications between devices). Receipt-level transaction data may also be associated with one or more individuals, and may de-anonymized or anonymized (e.g., lacking a degree of personally identifiable information, such as a full transaction card number), consistent with disclosed embodiments.

At exemplary step 604, processing device 104 may determine a subset of receipt-level transaction data (e.g., the receipt-level transaction data received at step 602). Determining a subset of the receipt-level transaction data may include one or more of discarding a portion of the receipt-level transaction data (e.g., received at step 602), identifying a portion of the receipt-level transaction data that satisfies one or more rules, or storing a portion of the receipt-level transaction data in memory. In some embodiments, processing device 104 may determine a subset of the receipt-level transaction data that satisfies a geographic parameter rule. A geographic parameter rule may include one or more geographic constraints, such as a geofenced area, an area associated with a particular identifier (e.g., a zip code, a county, a state, a region, a country), a driving distance threshold, or a driving time threshold. Additionally or alternatively, processing device 104 may determine a subset of the receipt-level transaction data that satisfies a profile rule. A profile rule may include one or more parameters that apply to a source of the receipt-level transaction data, such as a retail category parameter (e.g., constraining receipt-level transaction data to a particular retail category), an entity size parameter (e.g., constraining receipt-level transaction data to a store or entity of a particular physical size, revenue size, customer base size, or sales size), or a transaction pattern parameter (e.g., a parameter constraining receipt-level transaction data to a subset associated with a particular combination of attributes, such one or more of item category combinations, total purchase amounts, times of transactions, a full transaction card number, and/or a partial transaction card number).

At exemplary step 606, processing device 104 may alter the subset of receipt-level transaction data. Altering the subset of receipt-level transaction data may include imputing categories or values (e.g., null values) to the receipt-level transaction data, aggregating receipt-level transaction data (e.g., from multiple entities and/or transactions), or normalizing receipt-level transaction data. In some embodiments, processing device 104 may derive additional information from receipt-level transaction data, which may be used as part of the receipt-level transaction data in subsequent steps. For example, processing device 104 may derive (e.g., from receipt-level transaction data associated with multiple transactions) a group of most common (e.g., top 5) categories, most common (e.g., top 3) subcategories within a category, or most common (e.g., top 2) brands within a subcategory.

At exemplary step 608, processing device 104 may extract features from the altered subset of receipt-level transaction data. For example, processing device 104 may extract features from the altered subset of receipt-level transaction data for model generation (e.g., generation of a clustering model and/or temporal behavior profile model). A feature may include information contained in, indicated by, pointed to, or derivable from, the altered subset of receipt-level transaction data, such as one or more of a total number of items sold (e.g., in one or more transactions), a total transaction amount, an item category combination, or an item category distribution (e.g., a number of items in each category). In some embodiments, extracting features may include discarding redundant features (e.g., to prevent redundancy from skewing one or more generated clusters). Additionally or alternatively, extracting features may include converting text information into numerical values and/or placing numerical values into a particular data structure (e.g., a matrix). In some embodiments, a feature may be associated with a single transaction, or multiple transactions.

At exemplary step 610, processing device 104 may apply a dimensionality reduction operation to generate reduced-dimension features. A dimensionality reduction operation may include one or more transformations that condense feature information (e.g., the extracted features) into a number of dimensions fewer than an initial number of dimensions of the feature information, which may allow for easier analysis while still preserving meaningful properties of original data. For example, a dimensionality reduction operation may include applying one or more of Principal Component Analysis (PCA), Non-negative Matrix Factorization (NMF), Kernel Principal Component Analysis (Kernel PCA), Linear Discriminant Analysis (LDA), Generalized Discriminant Analysis (GDA), one or more autoencoders, T-distributed Stochastic Neighbor Embedding (t-SNE), Uniform Manifold Approximation and Projection, or a K-nearest neighbors (k-NN) algorithm. In some embodiments, a dimensionality reduction operation may be selected based on a number of initial dimensions associated with feature data and a number of resulting dimensions desired (e.g., through use of a dimensionality reduction operation). Applying a dimensionality reduction operation to features (e.g., feature data) may transform the features, thereby generating reduced-dimension features, which may appear very different from the features prior to dimensionality reduction. In some embodiments, a dimension associated with reduced-dimension features may represent one or more categories of items associated with a transaction and/or a total transaction amount. The same dimension or another dimension may represent a time and/or location associated with a transaction, or any other information associated with a transaction (e.g., a partial transaction card number).

At exemplary step 612, processing device 104 may generate clusters of behavior patterns. Generating clusters of behavior patterns may include plotting one or more feature values (e.g., values associated with or representing features) in a Euclidean space, discarding outlier feature values, computing distances between feature values, and/or generating a boundary within a Euclidean space. A cluster may include a group of feature values determined to be associated with each other (e.g., to be associated with a common individual, family, or other entity). In some embodiments, processing device 104 may determine that a group of feature values a group of feature values are associated with each other when they are within a threshold distance (e.g., a Euclidean distance) of one another, or when they fall within a threshold amount of Euclidean space (e.g., according to a boundary within a Euclidean space). In some embodiments, to generate the clusters, processing device 104 may applying at least one of an OPTICS algorithm, a DBSCAN algorithm, an HDBSCAN algorithm, or a k-means clustering algorithm, to feature values or other information associated with transaction data (e.g., using the feature values or other information as input to an equation). In some embodiments, generating clusters of behavior patterns may involve large amounts of data and computational complexity, and may produce an output for constructing a temporal behavior profile, which may have powerful predictive capabilities. For instance, a temporal behavior profile may be used to predict one or more of items to be purchased by an individual, revenue-impact of one or more items going out of stock, a competitor price change impact, an upsell opportunity, a cross-sell opportunity, a bundle/pricing recommender engine, an optimization of prices, a price guarantee opportunity for competitive products, a subscribe-and-save opportunity, an improved loyalty and rewards offer (e.g., at an SKU-level), and/or hyperlocal and personalized offers.

In some embodiments, the clusters may be associated with different individuals (e.g., each cluster may be associated with a different individual). In some embodiments, a cluster may represent a behavior pattern of an entity. For example, a cluster may include multiple feature values, with each feature value representing a transaction made at a different point in time. In some embodiments, after generating one or more clusters, process 600 may proceed to one or more steps of process 800, discussed below.

Figure 7:
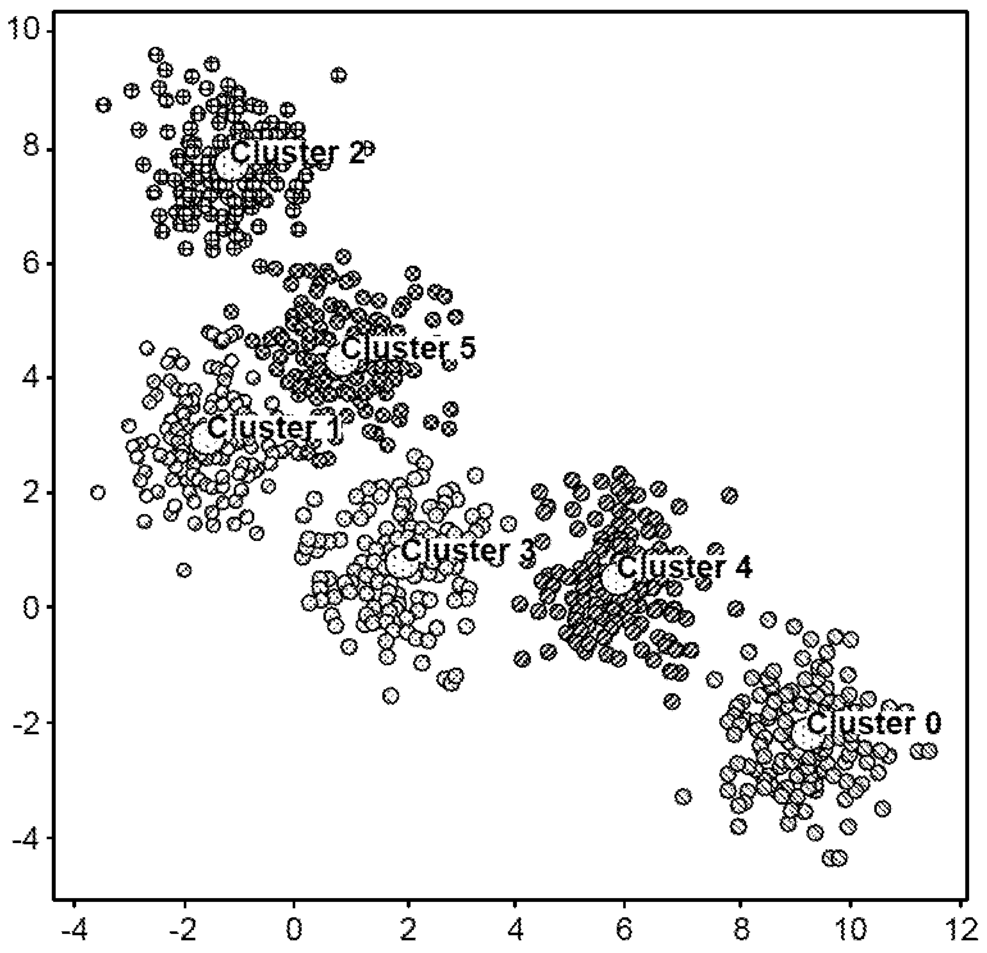
FIG. 7 is an example diagram of generated clusters associated with individual behavior patterns, consistent with the disclosed embodiments.

FIG. 7 is an example diagram of generated clusters associated with individual behavior patterns, consistent with the disclosed embodiments. In the example of FIG. 7, six clusters are shown (beginning with "Cluster 0"), though any number of clusters may be generated and represented. For purposes of visual demonstration, the example clusters shown in FIG. 7 are shown in a two-dimensional space, though clusters may also exist in dimensional spaces with another number of dimensions. In some embodiments, points associated with different clusters may be labeled to differentiate between clusters, such as with different colors or shading (as shown in FIG. 7). As discussed above, a dimension may represent one or more categories of items associated with a transaction, a time associated with a transaction, a location associated with a transaction, and/or a total transaction amount.

Figure 8:
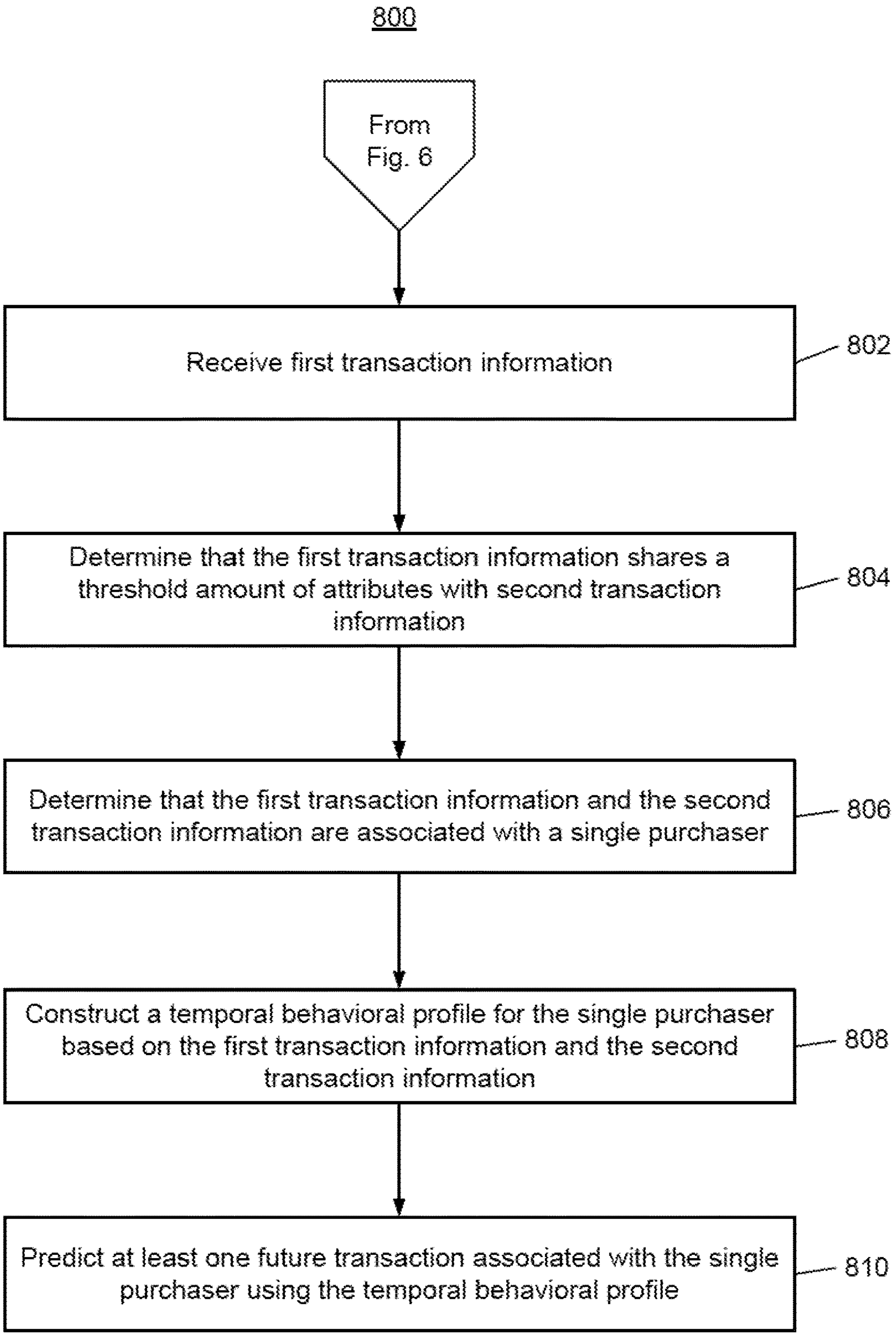
FIG. 8 is a flowchart of an example process for developing a temporal behavioral profile, consistent with the disclosed embodiments.

FIG. 8 is a flowchart of example process 800 for developing a temporal behavioral profile, consistent with the disclosed embodiments. Process 800 may be performed by a computer-implemented system (e.g., device 200) in modeling system 102 or transaction system 110, or by an apparatus (e.g., user device 106). The computer-implemented system may include a memory (e.g., memory 216) that stores instructions and a processor (e.g., processor 202) programmed to execute the instructions to implement process 600. Process 800 may be implemented as one or more software modules stored in memory 216 and executable by processor 202. For ease of description, some steps of process 800 are described as performed by a particular device, such as processing device 104. However, it should be noted that any step may be executed by any device within system architecture 100, such as processing device 112. Process 800 may incorporate aspects of steps from other processes discussed herein. For example, process 800 may determine a relationship between transaction information using one or more clusters, which may have been generated according to process 600. Process 800 may be implemented (e.g., executed) periodically (e.g., every day, every hour, or every predetermined time period), on demand (e.g., in response to a request received from a device such as processing device 112), and/or in response to a triggering action, such as a processing device detecting receipt of new transaction information.

Referring to process 800 shown in FIG. 8, at exemplary step 802, processing device 104 may receive first transaction information. In some embodiments, processing device 104 may receive first transaction information associated with a first transaction at a first time. First transaction information may include attributes including general transaction data (e.g., aggregated or statistical representations of receipt-level transaction data) and/or receipt-level transaction data (discussed above with respect to step 304), such as a payment method identifier, a purchase time (e.g., indicated by a timestamp), a purchase date (e.g., indicated by a timestamp), a full transaction card number, a partial transaction card number, a total transaction amount, or a store identifier. In some embodiments, the first transaction information may include data from which a specific purchaser or transaction card number cannot be determined (e.g., anonymized data). For example, the first transaction information may not include a full transaction card number (e.g., may include a partial transaction card number such as the last four digits of a transaction card number, may include an identifier representing a card number that does not include any part of the card number, or the like).

At exemplary step 804, processing device 104 may determine that the first transaction information shares a threshold amount of attributes with second transaction information, which may be associated with at least one second transaction at one or more second times different from the first time. The one or more second times may occur before the first time, after the first time, or both (i.e., in scenarios where there are multiple second times). Like first transaction information, second transaction information may include attributes including general transaction data and/or receipt-level transaction data. In some embodiments, some portions of the first transaction information may overlap with portions of the second transaction information, and other portions may not. Complete overlap or complete non-overlap are also possible. As mentioned above, second transaction information may be associated with at least one second transaction at one or more second times different from the first time. For example, second transaction information may include multiple datasets, and each dataset may be associated with a separate transaction made at a different points in time (e.g., different times across different and/or different times within a same day). The separate transactions may have occurred at a same location or different locations (e.g., different stores). A threshold amount of attributes (e.g., number or percentage of attributes) may be represented by one or more threshold values, which processing device 104 may use to determine if first transaction information shares a threshold amount of attributes with second transaction information. For example, processing device 104 may determine that first transaction information shares a threshold amount of attributes with second transaction information if three out of four particular attributes (e.g., a location, a total transaction amount, a partial transaction card number, a distribution of categories, a payment method) are shared. In some embodiments, certain attributes may be weighted differently than others for purposes of determining whether first transaction information shares a threshold amount of attributes with second transaction information.

In some embodiments, the first transaction information and the second transaction information may include (e.g., each include) at least one of a timestamp, a payment method type, location information, a seller identifier, a total transaction payment amount, an item payment amount, a subset of the full transaction card number, an item category, or any other transaction data attribute (e.g., general or receipt-level transaction information), as discussed above. For example, the first transaction information may include a timestamp, location information, a total transaction amount, and a subset of the full transaction card number (e.g., the last four digits of a transaction card number) and the second information may include the same types of attributes, though, for example, the timestamp information may differ from the first transaction information. In some embodiments, the first transaction information may indicate a first location and the second transaction information may indicate a second location. For example, the first transaction information may include one or more of geocoordinates, a street address, a zip code, an IP address, a store number, or any other identifier distinguishing a location associated with the first transaction information from other locations, consistent with disclosed embodiments, such as discussed above with respect to multiple processing devices 112. Similarly, the second transaction information may also include one or more of geocoordinates, a street address, a zip code, an IP address, or any other identifier distinguishing a location associated with the second transaction information from other locations. In some embodiments, location information may be received from 3rd party data provider 116 and/or crawled or scraped (e.g., by processing device 104) from one or more webpages. Additionally or alternatively, location information may be generated in response to communication between devices (e.g., transaction communications between a transaction system 110 and user device 106).

In some embodiments, determining that the first transaction information shares a threshold amount of attributes with the second transaction information may include determining that the first time and one of the second times are both within a same time of day and a same day of the week. A time of day may be determined by, and may include, any time period that occurs during every day, such as a single hour window (e.g., 10:00 a.m.-11:00 a.m.) or a multi-hour window (e.g., 12:00 p.m.-5:00 p.m.). Of course, time periods that are less than an hour increment or do not represent a whole number of hours are also possible. A time of day may also be considered any time period between events that is within a threshold. For example, processing device 104 may consider a first time of 9:30 a.m. (on a given day) and a second time of 10:15 a.m. (on the same given day) to be within a same time of day because they are within an hour time period threshold of each other (other time period thresholds are possible). As another example, processing device 104 may consider a first time of 2:05 p.m. on a Saturday and a second time of 2:55 p.m. on a Saturday to be within a same time of day and a same day of the week, if, for example, the same time of day is defined by data stored in memory 216 to be 2:00 p.m.-3:00 p.m., or within any hour time period threshold. In some embodiments, processing device 104 may use different thresholds to determine a same time of day at different times during a given day. For example, processing device 104 may use a half-hour threshold to determine a same time of day during an evening rush time, but may use a two-hour threshold to determine a same time of day during a morning timeframe.

In some embodiments, determining that the first transaction information shares a threshold amount of attributes with the second transaction information may include determining that the first location and the second location are both located within a geofence. A geofence may include a virtual boundary associated with a physical area, such as a physical area defined by multiple coordinates, a physical distance radius (e.g., limit) from a coordinate point, a driving time distance limit from a coordinate point, a driving distance limit from a coordinate point, a physical area associated with an area identifier (e.g., zip code, school district, administrative district), or any other physical area delimited from other physical areas. Determining that the first location and the second location are both located within a geofence may include determining first coordinates associated with the first location, determining second coordinates associated with the second location, and determining if both the first coordinates and the second coordinates are located within an area defined by the geofence.

At exemplary step 806, processing device 104 may determine that the first transaction information and the second transaction information are associated with a single purchaser. A single purchaser may include a common individual, a common family, or a common entity (e.g., an entity associated with a particular transaction card number). In some embodiments, processing device 104 may determine that the first transaction information and the second transaction information are associated with a single purchaser based on the determination that the first transaction information shares a threshold amount of attributes with the second transaction information (e.g. step 804). For example, processing device 104 may compare attributes between the first and second transaction information, including one or more of a partial payment card number, a store identifier, a zip code, a local market identifier, a type of payment, a payment scheme (e.g., a credit card servicers), or purchase behavior patterns (e.g., tracked using one or more attributes).

At exemplary step 808, processing device 104 may construct a temporal behavioral profile for the single purchaser based on the first transaction information and the second transaction information. A temporal behavioral profile may include a computerized model, an algorithm, a computerized combination of data relationships, or any model discussed with respect to memory 216. In some embodiments, a temporal behavioral profile may model actions of an entity (e.g., transactions) over time (e.g., over a day, a week, a month, a year, or any other time period). For example, the temporal behavioral profile may model a pattern over time of item purchases and item categories associated with the item purchases, such as based on transaction data received from one or more sources (e.g., a remote processing device 112). A temporal behavioral profile may also be configured for predicting (e.g., to predict) at least one future transaction associated with the single purchaser. For example, a temporal behavioral profile may include a model configured to receive model input including a future time (e.g., hour of a day, time of a day), and may be configured to generate model output by applying the model input to the model.

Constructing a temporal behavioral profile may include one or more of identifying transaction information (e.g., transaction information associated with a particular cluster), accessing transaction information, generating a virtual temporal representation, associating transaction actions (e.g., including transaction amounts, item categories, transaction locations, or transaction times) with the virtual temporal representation, generating one or more probabilities, or executing a machine learning operation, as discussed further herein. In some embodiments, the temporal behavioral profile may be constructed using a machine learning model trained using transaction information generated at different times and from multiple purchasers. For example, the transaction information used may include different data (e.g., feature values) associated with different respective transactions (occurring at different times and/or locations). In some embodiments, processing device 104 may train a machine learning model to predict a future transaction using model input corresponding to a first set of transaction information, which may include changing machine learning model parameters based on model output (e.g., using a second set of transaction information to update or validate the model). In some embodiments, the machine learning model may be generated by identifying geolocation information for multiple stores, altering receipt-level transaction data received from the multiple stores by imputing categories or values to the receipt-level transaction data, extracting features from the altered receipt-level transaction data for model generation, and generating clusters of behavior patterns based on the extracted features, as discussed above with respect to process 600 (e.g., step 606). Additionally or alternatively, the machine learning model may be generated by applying a dimensionality reduction operation to the extracted features prior to generating the clusters, as discussed above with respect to process 600 (e.g., step 608, step 610). In some embodiments, generating the clusters of behavior patterns may be performed by applying at least one of an OPTICS algorithm, a DBSCAN algorithm, an HDBSCAN algorithm, or a k-means clustering algorithm, as discussed above with respect to At exemplary step 810, processing device 104 may predict at least one future transaction associated with the single purchaser using the temporal behavioral profile. Predicting the at least one future transaction may include one or more of initializing the temporal behavioral profile (e.g., with seed values and/or model input values), accessing transaction information (e.g., associated with past transactions), updating the temporal behavioral profile, inputting query parameters to the temporal behavioral profile, determining a probability of a particular output (e.g., associated with a future action), determining a probability distribution of particular outputs over time, or otherwise prompting the temporal behavioral profile to generate a predictive output. For example, a temporal behavioral profile may include a model configured to receive model input, which may include, for example, a future time (e.g., hour of a day, time of a day), a location for a future transaction, an item or category for a future transaction, or any other transaction attribute for which predictive output may be generated. The model may be configured to generate (e.g., based on the model input) model output, such as a prediction of one or more items or item categories at or near the future time, a prediction of a time at which a particular item or item associated with a particular category will be purchased, or a prediction of a combination of model input predicted to produce a desired output (e.g., where a desired output, such as a sale of an item during a time period, constitutes a model input). In some embodiments, in addition to, or instead of predicting at least one future transaction associated with the single purchaser, processing device 104 may predict at least one future non-transaction (e.g., a probability that a particular transaction will not occur, or will not occur during a time period). Following the intensely technical process of its construction, a temporal behavioral profile may be configured to predict one or more future events (e.g., probabilities associated with transaction information), predictions otherwise impractical for the human mind to arrive at using the input data from which the temporal behavioral profile was constructed. For instance, both the breadth of the input data, as well as the conditional and real-time nature of the computerized predictive outputs make it impractical, if not impossible, for the human mind to accomplish these predictions.

In some embodiments, the temporal behavioral profile may be updated in response to transaction information that is new to the model. For example, processing device 104 may receive third transaction information associated with a third transaction at a third time and may modify the temporal behavioral profile based on the third transaction information. The third transaction information may share attributes with the first or second transaction information, such as a common geographic area and/or a same sequence of the last four digits of a transaction card number. The third time may occur at any point relative to the first time and second time, such as after both the first time and the second time, or after the first time but before the second time.

In some embodiments, processing device 104 may also generate a recommended action based on the temporal behavioral profile. For example, processing device 104 may use the temporal behavioral profile to predict one or more attributes of transactional information, upon which a recommended action may be based. A recommended action may include a manual or automated activity, which processing device 104 may determine, using the temporal behavioral profile, has a threshold probability of leading to a predicted output. For example, a recommended action, which may be associated with an item or category associated with the temporal behavioral profile, may include at least one of a price adjustment, an offer (e.g., a promotion, such as a discount), an upsell suggestion, a cross-sell suggestion. A recommended action may take the form of one or more of text, a graphic (e.g., a dynamic graphic that changes displayed information in response to user input), digital audio information (e.g., usable to output sound at an output device), an animation, or any other visual or auditory output conveying information related to the temporal behavioral profile (e.g., which may be output at output device 210). For example, a recommended action may indicate to offer a promotion to an individual or device associated with the temporal behavioral profile, to increase stock of a particular item or category of items, to change a placement (e.g., within a physical store) of a particular item or category of items, to change visual information associated with a particular item or category of items (e.g., structural or content information displayed in a physical store and/or present on a webpage), to begin or end a discount associated with a particular item or category of items, or to change a price associated with a particular item or category of items. In some embodiments, processing device 104 may implement an action based on the temporal behavioral profile. For example, processing device 104 may, in response to a predictive output produced by the temporal behavioral profile, cause digital information (e.g., a promotional offer) to be transmitted to another device associated with an individual, such as while the individual is present in a store. In some embodiments, a device (e.g., smart shopping cart, wireless electronic tag sensor, camera, weight sensor, pressure sensor) may detect one or more items the individual has placed in a cart (or other shopping receptacle), and may transmit this detected information to processing device 104, which may generate additional outputs based on this information (e.g., real-time cart information).

In some embodiments, the recommended action may be transmitted to another device, such as a remote device (e.g., user device 106 or processing device 112). For example, processing device 104 may provide the recommended action, based on the predicted at least one future transaction, to a remote device (e.g., a processing device 112 or a user device 106, which may be connected to transaction system 110) associated with a seller (e.g., an organization, a store, a business) of an item associated with the first transaction information (e.g., the first transaction information that the temporal behavioral profile was constructed based on). For example, processing device 104 may be programmed to provide the recommended action if the predicted at least one future transaction includes a combination of parameters (e.g., defined by the remote device or associated system). In some embodiments, the recommended action may be transmitted in real time relative to the generation of the recommended action based on the temporal behavioral profile.

In some embodiments, processing device 104 may prompt another device (e.g., processing device 112 or 3rd party data provider 116) for additional information (e.g., in-stock information, demographic information, live or predicted weather information, live or predicted traffic information), and may generate the recommended action based on the additional information. In some embodiments, processing device 104 may crawl or scrape (e.g., periodically) digital information from one or more webpages, and may generate the recommended action based on the crawled or scraped digital information. In some embodiments, a recommended action may be based on, or include, model input (e.g., a promotion, an item price, an item placement, an item discount, an item in-stock amount) predicted by a machine learning model to cause, or have a threshold probability of causing, a particular outcome (e.g., a transaction of a particular item or category with an entity associated with a temporal behavioral profile, a change in or amount of sales, a change in or amount of profit, a change in or amount of revenue, a change in or amount of overstock), which may be based on one or more machine-learned relationships (e.g., according one or more operations associated with processes 300, 400, 600, or 800). A recommended action may also share any characteristic of a recommendation, discussed above.

Figure 9:
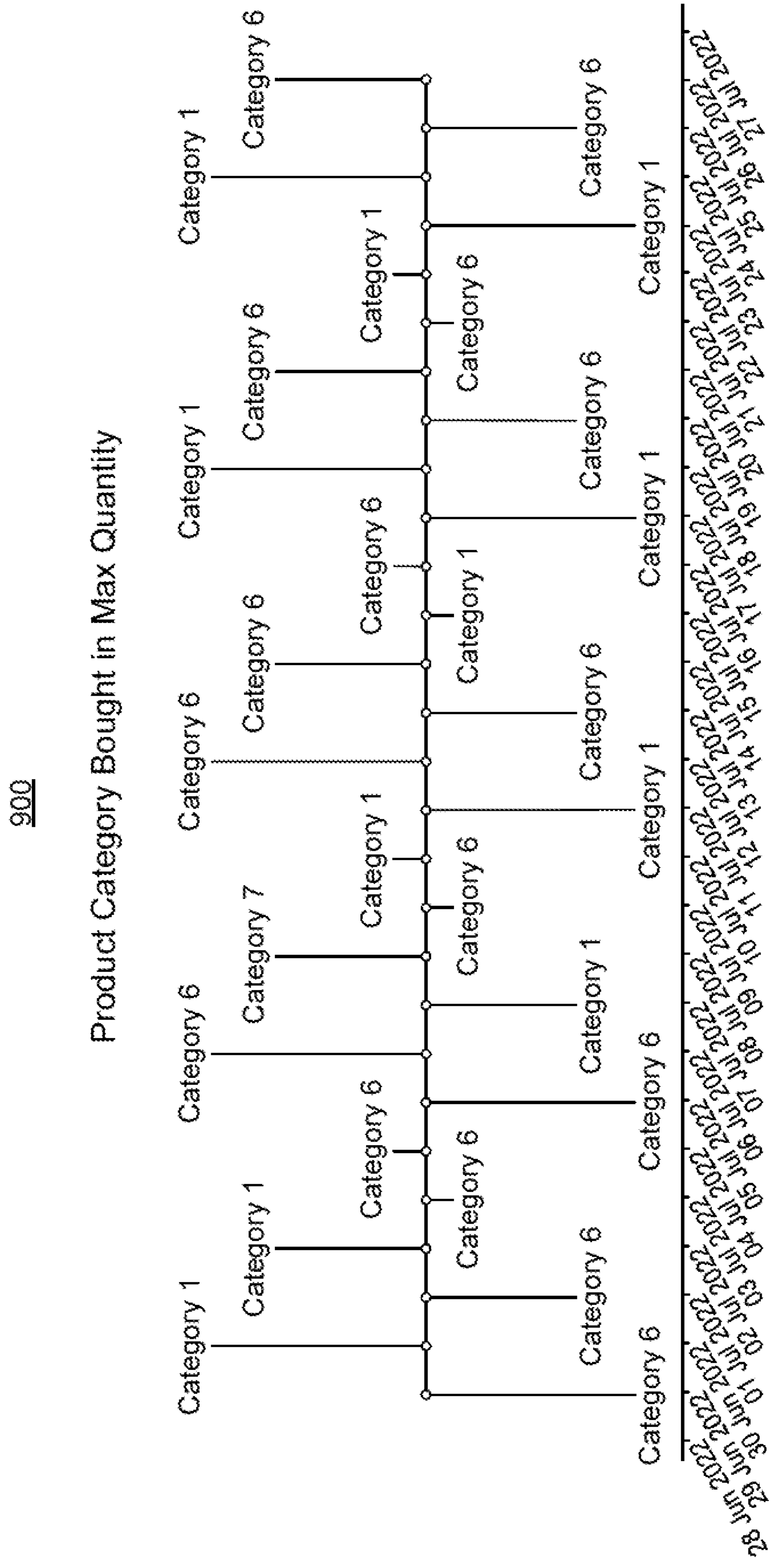
FIG. 9 is an example diagram of a transaction pattern timeline, consistent with the disclosed embodiments.

FIG. 9 is an example diagram of a transaction pattern timeline 900, consistent with the disclosed embodiments. Transaction pattern timeline 900 may constitute, be included as part of, or be associated with, a temporal behavioral profile, discussed above. For example, transaction pattern timeline 900 may include predicted transactions associated with combinations of item categories, transaction amounts, and/or transaction times. Additionally or alternatively, transaction pattern timeline 900 may include previous transaction information. In some embodiments, transaction pattern timeline 900 may include a combination of items and/or item categories associated with a single transaction (e.g., a predicted transaction or a past transaction). In some embodiments, transaction pattern timeline 900 may include one or more probabilities associated with a potential future transaction. For example, transaction pattern timeline 900 may include a probability a particular item will be purchased during a particular time period, a probability an item from a particular category will be purchased during a particular time period, a probability of a transaction amount for a particular category and/or entire transaction, a probability of a particular transaction, or any other probability associated with transaction information, consistent with disclosed embodiments.

A non-transitory computer-readable medium may be provided that stores instructions for a processor (e.g., processor 202) for processing a financial transaction according to the example flowcharts of FIGS. 3, 4, 6, and 8 above, consistent with embodiments in the present disclosure. For example, the instructions stored in the non-transitory computer-readable medium may be executed by the processor for performing processes 300, 400, 600, or 800 in part or in entirety. Common forms of non-transitory media include, for example, a floppy disk, a flexible disk, hard disk, solid-state drive, magnetic tape, or any other magnetic data storage medium, a Compact Disc Read-Only Memory (CD-ROM), any other optical data storage medium, any physical medium with patterns of holes, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, Extensive Markup Language (XML), Hypertext Markup Language (HTML), Asynchronous Javascript and XML (AJAX), HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods, or portions of the steps of the disclosed methods, may be modified in any manner, including by reordering steps, inserting steps, repeating steps, and/or deleting steps (including between steps of different exemplary methods). It is intended, therefore, that the specification and examples be considered as illustrative only, with a true scope and spirit being indicated by the following claims and their full scope of equivalents.

What is claimed is:

1. A system for predicting item group composition, the system comprising:

at least one processor; and a non-transitory computer-readable medium containing instructions that, when executed by the at least one processor, cause the at least one processor to perform operations comprising:

receiving entity identification information and a timestamp associated with a transaction without receiving information distinguishing items associated with the transaction, wherein the entity identification information identifies a first store;

determining, based on the entity identification information, a localized machine learning model trained to predict categories of items based on transaction information applying to all of the items associated with the transaction, wherein the localized machine learning model is trained to predict categories of items based on data received from at least one second store, the at least one second store being in a same cluster as the first store, wherein the first store and the at least one second store are clustered in a same cluster based on application of a clustering model to first attribute data received from the first store and second attribute data received from the at least one second store, and wherein the clustering model is configured to:

determine a first numeric-space representation for the first store based on the first attribute data;

determine a second numeric-space representation for the at least one second store based on the second attribute data;

compute at least one first distance between the first numeric-space representation and at least one of a plurality of third numeric-space representations;

associate the first numeric-space representation with the same cluster based on the computed at least one first distance;

compute at least one second distance between the second numeric-space representation and at least one of the plurality of third numeric-space representations; and associate the second numeric-space representation with the same cluster based on the computed at least one second distance; and applying the localized machine learning model to a model input to generate predicted categories of items associated with the transaction, the model input including the received entity identification information and a timestamp but not including information distinguishing items associated with the transaction.

2. The system of claim 1, wherein the determined localized machine learning model comprises at least one of an Extreme Gradient Boosting (XG-Boost) model, a random forest model, or a deep learning model.

3. The system of claim 1, wherein:

the operations further comprise receiving a total transaction amount associated with the transaction, without receiving information distinguishing items associated with the transaction; and the model input further includes the total transaction amount but does not include information distinguishing items associated with the transaction.

4. The system of claim 1, wherein the clustering model is generated by performing at least one of:

aggregating receipt-level transaction data from multiple entities;

imputing values to a portion of the receipt-level transaction data;

removing outlier values from the receipt-level transaction data; or applying price constraints or basket constraints to receipt-level transaction data.

5. The system of claim 1, wherein:

the first attribute data includes at least one of a location of the first store, population metrics associated with the first store, a sector category associated with the first store, or transaction trend information associated with the first store; and the second attribute data includes at least one of a location of the at least one second store, population metrics associated with the at least one second store, a sector category associated with the at least one second store, or transaction trend information associated with the at least one second store.

6. The system of claim 5, the operations further comprising extrapolating, by the localized machine learning model or another machine learning model, the sector category associated with the first store or the sector category associated with the at least one second store, based on a correlation learned from receipt-level transaction data.

7. The system of claim 5, wherein:

the first attribute data includes first transaction trend information associated with the first store the second attribute data includes second transaction trend information associated with the at least one second store; and the first transaction trend information and the second transaction trend information both include at least one of a Stock Keeping Unit (SKU) number, an item purchase amount, a payment method identifier, a purchase time, or a discount identifier.

8. The system of claim 7, wherein applying the localized machine learning model to the model input generates at least one predicted brand associated with the transaction.

9. The system of claim 1, wherein applying the localized machine learning model to the model input further generates predicted sub-categories of items associated with the transaction.

10. The system of claim 1, wherein the operations further comprise generating a recommendation based on the generated predicted categories of items associated with the transaction.

11. The system of claim 1, wherein the operations further comprise causing the alteration of, based on the generated predicted categories of items associated with the transaction, a graphic presented at a display.

12. The system of claim 1, wherein the operations further comprise:

generating, based on the generated predicted categories of items associated with the transaction, an offer notification; and transmitting the offer notification to a user device.

13. A method for predicting item group composition, comprising:

receiving entity identification information and a timestamp associated with a transaction without receiving information distinguishing items associated with the transaction, wherein the entity identification information identifies a first store;

determining, based on the entity identification information, a localized machine learning model trained to predict categories of items based on transaction information applying to all of the items associated with the transaction, wherein the localized machine learning model is trained to predict categories of items based on data received from at least one second store, the at least one second store being in a same cluster as the first store, wherein the first store and the at least one second store are clustered in a same cluster based on application of a clustering model to first attribute data received from the first store and second attribute data received from the at least one second store, wherein the clustering model is configured to:

determine a first numeric-space representation for the first store based on the first attribute data;

determine a second numeric-space representation for the at least one second store based on the second attribute data;

compute at least one first distance between the first numeric-space representation and at least one of a plurality of third numeric-space representations;

associate the first numeric-space representation with the same cluster based on the computed at least one first distance;

compute at least one second distance between the second numeric-space representation and at least one of a plurality of third numeric-space representations; and associate the second numeric-space representation with the same cluster based on the computed at least one second distance; and applying the localized machine learning model to a model input to generate predicted categories of items associated with the transaction, the model input including the received entity identification information and a timestamp but not including information distinguishing items associated with the transaction.

14. A system for training an item group composition prediction model, the system comprising:

at least one processor; and a non-transitory computer-readable medium containing instructions that, when executed by the at least one processor, cause the at least one processor to perform operations comprising:

receiving first attribute data from a first store and second attribute data from at least one second store;

applying a clustering model to the first attribute data and the second attribute data to cluster the first store and the at least one second store in a same cluster, wherein the clustering model is configured to:

determine a first numeric-space representation for the first store based on the first attribute data;

determine a second numeric-space representation for the at least one second store based on the second attribute data;

compute at least one first distance between the first numeric-space representation and at least one of a plurality of third numeric-space representations;

associate the first numeric-space representation with the same cluster based on the computed at least one first distance;

compute at least one second distance between the second numeric-space representation and at least one of a plurality of third numeric-space representations; and associate the second numeric-space representation with the same cluster based on the computed at least one second distance;

initializing an untrained machine learning model;

training the untrained machine learning model to predict item categories by:

inputting model training data to the untrained machine learning model, the model training data comprising first receipt-level transaction data and categories of items associated with the first receipt-level transaction data, the model training data being received from multiple distinct entities, including at least the first store and the at least one second store; and modifying at least one parameter of the untrained machine learning model to improve prediction of the categories of the items; and validating the trained machine learning model by inputting model validation data to the trained machine learning model, the model validation data comprising second receipt-level transaction data not included in the first receipt-level transaction data.

* * * * *